(12) United States Patent
White et al.

(10) Patent No.: US 12,444,141 B2
(45) Date of Patent: Oct. 14, 2025

(54) AUGMENTED REALITY SURGICAL TECHNIQUE GUIDANCE

(71) Applicant: Zimmer, Inc., Warsaw, IN (US)

(72) Inventors: John R. White, Winona Lake, IN (US); Seth Anderson Nash, Fort Wayne, IN (US); Annelise Galloway, Winona Lake, IN (US); Jody L. Claypool, Warsaw, IN (US); J. Scott Owens, East Sparta, OH (US)

(73) Assignee: Zimmer, Inc., Warsaw, IN (US)

( * ) Notice: Subject to any disclaimer, the term of this patent is extended or adjusted under 35 U.S.C. 154(b) by 0 days.

(21) Appl. No.: 15/703,239

(22) Filed: Sep. 13, 2017

(65) Prior Publication Data

US 2018/0082480 A1 Mar. 22, 2018

Related U.S. Application Data

(60) Provisional application No. 62/470,690, filed on Mar. 13, 2017, provisional application No. 62/395,591, filed on Sep. 16, 2016.

(51) Int. Cl.
*G06T 19/00* (2011.01)
*A61B 34/00* (2016.01)
(Continued)

(52) U.S. Cl.
CPC ............ *G06T 19/006* (2013.01); *A61B 34/25* (2016.02); *A61B 50/20* (2016.02); *A61B 50/30* (2016.02);
(Continued)

(58) Field of Classification Search
CPC ..... G06T 19/006; G06T 11/00; G06T 11/003; G06T 11/60; A61B 34/25; A61B 34/10;
(Continued)

(56) References Cited

U.S. PATENT DOCUMENTS

| | | | |
|---|---|---|---|
| 5,610,811 A * | 3/1997 | Honda | G06F 19/324 |
| | | | 705/2 |
| 5,791,907 A * | 8/1998 | Ramshaw | G09B 23/285 |
| | | | 434/323 |

(Continued)

FOREIGN PATENT DOCUMENTS

| | | |
|---|---|---|
| EP | 2618313 | 7/2014 |
| WO | 2005084570 | 9/2005 |

(Continued)

OTHER PUBLICATIONS

Surgical Simulation: An Emerging Technology for Training in Emergency Medicine Scott L. Delp, Peter Loan, Cagatay Basdogan, and Joseph M. Rosen Presence: Teleoperators and Virtual Environments 1997 6:2, 147-159 (Year: 1997).*

(Continued)

*Primary Examiner* — Motilewa Good-Johnson
(74) *Attorney, Agent, or Firm* — Schwegman Lundberg & Woessner, P.A.

(57) ABSTRACT

A system and method for using augmented reality device for use during a surgical procedure are described. A system may include an augmented reality device to present a virtual indication, such as a virtual indication of a surgical instrument, a force vector, a direction, or the like. The augmented reality device may present a virtual aspect of a procedure, such as a virtual animation of a step of a procedure. The augmented reality device may present a virtual object, indication, aspect, etc., within a surgical field while permitting the surgical field or aspects of the surgical field to be viewed through the augmented reality display (e.g., presenting virtual objects mixed with real objects).

10 Claims, 13 Drawing Sheets

(51) Int. Cl.

| | | |
|---|---|---|
| *A61B 34/10* | (2016.01) | |
| *A61B 50/00* | (2016.01) | |
| *A61B 50/20* | (2016.01) | |
| *A61B 50/30* | (2016.01) | |
| *A61B 50/31* | (2016.01) | |
| *A61B 50/33* | (2016.01) | |
| *A61B 90/00* | (2016.01) | |
| *A61B 90/94* | (2016.01) | |
| *A61B 90/96* | (2016.01) | |
| *A61B 90/98* | (2016.01) | |
| *G02B 27/01* | (2006.01) | |
| *G06F 3/01* | (2006.01) | |
| *G06F 3/03* | (2006.01) | |
| *G06T 11/00* | (2006.01) | |
| *G06T 11/60* | (2006.01) | |

(52) U.S. Cl.
CPC .............. *A61B 50/33* (2016.02); *A61B 90/36* (2016.02); *A61B 90/94* (2016.02); *A61B 90/96* (2016.02); *A61B 90/98* (2016.02); *G06F 3/011* (2013.01); *G06F 3/017* (2013.01); *G06F 3/0304* (2013.01); *G06T 11/00* (2013.01); *G06T 11/003* (2013.01); *G06T 11/60* (2013.01); *A61B 34/10* (2016.02); *A61B 2034/107* (2016.02); *A61B 2034/252* (2016.02); *A61B 2034/254* (2016.02); *A61B 2034/256* (2016.02); *A61B 50/00* (2016.02); *A61B 2050/3008* (2016.02); *A61B 2050/311* (2016.02); *A61B 2090/365* (2016.02); *A63F 2300/69* (2013.01); *G02B 2027/0138* (2013.01); *G02B 2027/014* (2013.01); *G02B 27/017* (2013.01); *G06F 3/014* (2013.01); *G06F 3/016* (2013.01); *G09G 2340/125* (2013.01)

(58) Field of Classification Search
CPC ... A61B 34/20; A61B 2090/365; A61B 17/00; A61B 2017/00207; A61B 2017/00216; A61B 2034/102; A61B 2034/252; A61B 2034/254; A61B 8/468; A61B 90/37; A61B 50/20; A61B 50/30; A61B 50/33; A61B 90/36; A61B 90/94; A61B 90/96; A61B 90/98; A61B 50/00; A61B 2034/107; A61B 2034/256; A61B 2050/3008; A61B 2050/311; G06F 3/011; G06F 3/017; G06F 3/0304; G06F 3/014; G06F 3/016; A63F 2300/69; G02B 27/017; G02B 2027/0138; G02B 2027/014; G09G 2340/125

See application file for complete search history.

(56) References Cited

U.S. PATENT DOCUMENTS

| | | | |
|---|---|---|---|
| 6,701,174 B1 | 3/2004 | Krause et al. | |
| 7,362,228 B2 * | 4/2008 | Nycz .................. | A61F 2/4657 340/568.1 |
| 7,383,073 B1 * | 6/2008 | Abovitz ............... | G16H 40/63 600/407 |
| 7,835,784 B2 * | 11/2010 | Mire ..................... | A61B 90/39 600/424 |
| 7,920,162 B2 * | 4/2011 | Masini .................. | A61B 34/20 600/406 |
| 8,100,133 B2 * | 1/2012 | Mintz ................... | B25J 9/0084 128/898 |
| 8,233,963 B2 * | 7/2012 | Hartmann ............. | A61B 34/20 600/424 |
| 8,425,523 B2 * | 4/2013 | Aram ................. | A61B 17/1764 606/88 |
| 8,600,478 B2 * | 12/2013 | Verard ..................... | A61B 5/06 600/424 |
| 8,884,618 B2 | 11/2014 | Mahfouz | |
| 9,105,207 B2 | 8/2015 | Leung | |
| 9,226,686 B2 * | 1/2016 | Blair ................. | G06K 19/07773 |
| 9,248,000 B2 | 2/2016 | Sarvestani et al. | |
| 9,492,240 B2 * | 11/2016 | Itkowitz ................ | A61B 34/37 |
| 9,538,962 B1 | 1/2017 | Hannaford et al. | |
| 9,665,960 B1 * | 5/2017 | Masters .................. | G06T 13/80 |
| 9,718,190 B2 * | 8/2017 | Larkin .................. | B25J 9/1692 |
| 9,757,087 B2 * | 9/2017 | Simon .................... | A61B 34/20 |
| 9,788,907 B1 | 10/2017 | Alvi et al. | |
| 9,836,654 B1 * | 12/2017 | Alvi ....................... | G16H 15/00 |
| 9,847,044 B1 * | 12/2017 | Foster .................... | G09B 5/065 |
| 9,888,967 B2 * | 2/2018 | Granchi ................ | A61B 34/10 |
| 9,892,564 B1 * | 2/2018 | Cvetko .................. | G06T 19/006 |
| 9,898,664 B2 * | 2/2018 | Matsuzaki ........... | G06K 9/00711 |
| 9,918,740 B2 * | 3/2018 | Uthgenannt ........... | A61B 50/30 |
| 9,922,172 B1 * | 3/2018 | Alvi ....................... | G16H 70/20 |
| 10,008,017 B2 * | 6/2018 | Itkowitz ................. | G06T 11/40 |
| 10,105,149 B2 * | 10/2018 | Haider ................... | A61B 34/20 |
| 10,166,019 B2 * | 1/2019 | Nawana ................ | A61B 5/7282 |
| 10,169,696 B2 * | 1/2019 | Lee .................. | G06K 19/07749 |
| 10,235,567 B2 * | 3/2019 | Cork ....................... | G06F 3/167 |
| 10,235,807 B2 * | 3/2019 | Thomas ................ | G06T 19/006 |
| 10,398,513 B2 * | 9/2019 | Razzaque .............. | A61B 18/20 |
| 10,517,680 B2 * | 12/2019 | Moctezuma ........... | A61B 90/90 |
| 10,575,905 B2 | 3/2020 | Nash et al. | |
| 11,058,495 B2 * | 7/2021 | May ....................... | A61B 90/39 |
| 11,138,436 B2 * | 10/2021 | Powderly ............... | G06V 20/40 |
| 11,432,877 B2 | 9/2022 | Nash et al. | |
| 2002/0082498 A1 * | 6/2002 | Wendt .................... | G16H 40/67 348/E13.059 |
| 2002/0163499 A1 | 11/2002 | Sauer | |
| 2003/0176783 A1 | 9/2003 | Hu | |
| 2004/0044295 A1 * | 3/2004 | Reinert .............. | A61B 17/1757 600/587 |
| 2004/0046711 A1 * | 3/2004 | Triebfuerst .......... | G05B 19/409 345/8 |
| 2006/0043179 A1 * | 3/2006 | Nycz .................... | A61B 50/33 235/385 |
| 2006/0142657 A1 | 6/2006 | Quaid et al. | |
| 2006/0142739 A1 * | 6/2006 | DiSilestro .............. | A61B 90/90 606/1 |
| 2007/0038059 A1 * | 2/2007 | Sheffer .................. | A61B 90/36 600/407 |
| 2007/0136218 A1 * | 6/2007 | Bauer .................. | G06F 19/3481 706/12 |
| 2007/0249967 A1 | 10/2007 | Buly et al. | |
| 2008/0200926 A1 * | 8/2008 | Verard .................... | A61B 90/98 606/130 |
| 2009/0017430 A1 * | 1/2009 | Muller-Daniels ...... | G09B 23/30 434/262 |
| 2010/0159434 A1 * | 6/2010 | Lampotang ............ | G09B 9/00 434/365 |
| 2010/0311028 A1 * | 12/2010 | Bell, III ................ | G09B 23/28 434/263 |
| 2011/0093087 A1 | 4/2011 | Mcmahon et al. | |
| 2012/0075343 A1 * | 3/2012 | Chen ...................... | G09G 5/397 345/633 |
| 2013/0191099 A1 | 7/2013 | Krekel | |
| 2013/0267838 A1 * | 10/2013 | Fronk .................... | A61B 5/064 600/424 |
| 2014/0081659 A1 * | 3/2014 | Nawana ................ | G06F 19/00 705/3 |
| 2014/0188240 A1 | 7/2014 | Lang et al. | |
| 2014/0272866 A1 * | 9/2014 | Kim ...................... | G09B 23/28 434/262 |
| 2014/0275760 A1 * | 9/2014 | Lee ....................... | A61B 34/30 600/102 |
| 2015/0297313 A1 | 10/2015 | Reiter et al. | |
| 2015/0366628 A1 * | 12/2015 | Ingmanson ............ | A61B 5/015 600/424 |
| 2016/0035108 A1 | 2/2016 | Yu et al. | |

(56) References Cited

U.S. PATENT DOCUMENTS

| | | | |
|---|---|---|---|
| 2016/0045276 A1* | 2/2016 | Pfanner | A61B 90/94 235/385 |
| 2016/0089153 A1 | 3/2016 | Couture et al. | |
| 2016/0106554 A1 | 4/2016 | Lavallee | |
| 2016/0154620 A1* | 6/2016 | Tsuda | G06F 19/3481 345/633 |
| 2016/0191887 A1* | 6/2016 | Casas | H04N 13/279 348/47 |
| 2016/0225192 A1 | 8/2016 | Jones et al. | |
| 2016/0228193 A1 | 8/2016 | Moctezuma de la Barrera et al. | |
| 2016/0249989 A1 | 9/2016 | Devam et al. | |
| 2016/0287337 A1* | 10/2016 | Aram | A61B 34/10 |
| 2016/0324580 A1 | 11/2016 | Esterberg | |
| 2017/0027651 A1 | 2/2017 | Esterberg | |
| 2017/0099479 A1 | 4/2017 | Browd et al. | |
| 2017/0169561 A1* | 6/2017 | Mullins | G06T 7/0008 |
| 2017/0202630 A1* | 7/2017 | Gerstner | A61B 50/15 |
| 2017/0255450 A1* | 9/2017 | Mullins | G06T 19/00 |
| 2017/0258526 A1* | 9/2017 | Lang | A61B 17/1775 |
| 2017/0292827 A1 | 10/2017 | Haverkamp | |
| 2017/0312031 A1 | 11/2017 | Amanatullah et al. | |
| 2017/0312032 A1* | 11/2017 | Amanatullah | A61B 34/10 |
| 2017/0323062 A1* | 11/2017 | Djajadiningrat | G06F 16/3326 |
| 2017/0337402 A1* | 11/2017 | Todeschini | G06Q 50/04 |
| 2017/0360513 A1 | 12/2017 | Amiot et al. | |
| 2018/0021097 A1* | 1/2018 | Quaid | A61B 34/30 |
| 2018/0032130 A1* | 2/2018 | Meglan | G02B 27/017 |
| 2018/0071032 A1* | 3/2018 | de Almeida Barreto | G06F 19/00 |
| 2018/0090029 A1* | 3/2018 | Fisher | A61B 34/20 |
| 2018/0098813 A1* | 4/2018 | Nesichi | A61B 34/10 |
| 2018/0116823 A1 | 5/2018 | Johannaber et al. | |
| 2018/0256256 A1 | 9/2018 | May et al. | |
| 2018/0256258 A1* | 9/2018 | Nash | G06T 19/006 |
| 2018/0279913 A1 | 10/2018 | Frasier et al. | |
| 2018/0338814 A1* | 11/2018 | Saget | G06T 19/006 |
| 2019/0011703 A1* | 1/2019 | Robaina | A61B 90/36 |
| 2019/0038362 A1 | 2/2019 | Nash et al. | |
| 2019/0124391 A1* | 4/2019 | Mullins | H04N 21/6106 |
| 2021/0030479 A1 | 2/2021 | Marti et al. | |
| 2022/0027629 A1* | 1/2022 | Case | G02B 27/0172 |
| 2023/0017128 A1 | 1/2023 | Nash et al. | |

FOREIGN PATENT DOCUMENTS

| | | |
|---|---|---|
| WO | WO-2015192117 A1 | 12/2015 |
| WO | 2016133644 | 8/2016 |
| WO | WO-2017115227 A1 | 7/2017 |
| WO | 2018052966 | 3/2018 |
| WO | WO-2018169891 A1 | 9/2018 |
| WO | WO-2018052966 A8 | 10/2018 |

OTHER PUBLICATIONS

"International Application Serial No. PCT/US2017/051312, Invitation to Pay Add'l Fees and Partial Search Rpt mailed Dec. 8, 2017", 15 pgs.
"International Application Serial No. PCT/US2017/051312, International Search Report mailed Feb. 5, 2018", 7 pgs.
"International Application Serial No. PCT/US2017/051312, Written Opinion mailed Feb. 5, 2018", 13 pgs.
Stefl, M., "Spinopelvic mobility and acetabular component position for total hip arthroplasty", Bone Joint J 2017, (2017), 9 pgs.
"International Application Serial No. PCT/US2018/022074, International Search Report mailed Jun. 6, 2018", 8 pgs.
"International Application Serial No. PCT/US2018/022074, Written Opinion mailed Jun. 6, 2018", 10 pgs.
U.S. Appl. No. 16/040,951, filed Jul. 20, 2018, Surgical Field Camera System.
U.S. Appl. No. 15/919,139, filed Mar. 12, 2018, Augmented Reality Diagnosis Guidance.
"U.S. Appl. No. 15/919,139, Final Office Action mailed Feb. 12, 2019", 16 pgs.
"International Application Serial No. PCT US2017 051312, International Preliminary Report on Patentability mailed Mar. 28, 2019", 15 pgs.
"U.S. Appl. No. 15/919,139, Examiner Interview Summary mailed Apr. 12, 2019", 3 pgs.
"U.S. Appl. No. 15/919,139, Response filed Apr. 12, 2019 to Final Office Action mailed Feb. 12, 2019", 13 pgs.
"U.S. Appl. No. 15/919,139, Non Final Office Action mailed Oct. 10, 2018", 15 pgs.
"U.S. Appl. No. 15/919,139, Response Filed Jan. 10, 2019 to Non-Final Office Action", 9 pgs.
"U.S. Appl. No. 15/919,139, Advisory Action mailed May 13, 2019", 3 pgs.
"U.S. Appl. No. 15/919,139, Notice of Allowance mailed Oct. 16, 2019", 9 pages.
"Australian Application Serial No. 2018236172, First Examination Report mailed Jun. 3, 2020", 4 pages.
"European Application Serial No. 18717148.3, Response to Communication pursuant to Rules 161(1) and 162 EPC filed Jun. 2, 2020", 27 pages.
"U.S. Appl. No. 16/040,951, Advisory Action mailed Mar. 28, 2022", 3 pgs.
"U.S. Appl. No. 16/040,951, Advisory Action mailed May 28, 2021", 5 pgs.
"U.S. Appl. No. 16/040,951, Final Office Action mailed Jan. 5, 2022", 46 pgs.
"U.S. Appl. No. 16/040,951, Final Office Action mailed Mar. 8, 2021", 34 pgs.
"U.S. Appl. No. 16/040,951, Non Final Office Action mailed Jun. 23, 2021", 40 pgs.
"U.S. Appl. No. 16/040,951, Non Final Office Action mailed Oct. 16, 2020", 30 pgs.
"U.S. Appl. No. 16/040,951, Notice of Allowance mailed Apr. 26, 2022", 13 pgs.
"U.S. Appl. No. 16/040,951, Response filed Jan. 18, 2021 to Non Final Office Action mailed Oct. 16, 2020", 9 pgs.
"U.S. Appl. No. 16/040,951, Response filed Mar. 4, 2022 to Final Office Action mailed Jan. 5, 2022", 10 pgs.
"U.S. Appl. No. 16/040,951, Response filed Mar. 30, 2022 to Advisory Action mailed Mar. 28, 2022", 10 pgs.
"U.S. Appl. No. 16/040,951, Response filed May 10, 2021 to Final Office Action mailed Mar. 8, 2021", 11 pgs.
"U.S. Appl. No. 16/040,951, Response filed Jun. 8, 2021 to Advisory Action mailed May 28, 2021", 11 pgs.
"U.S. Appl. No. 16/040,951, Response filed Sep. 23, 2021 to Non Final Office Action mailed Jun. 23, 2021", 12 pgs.
"U.S. Appl. No. 17/876,918, Preliminary Amendment Filed Oct. 10, 2022", 8 pgs.
"Augmented Reality Is Changing Neurosurgery for the Better", Futurism, [Online] Retrieved from the Internet: <URL: https://www.youtube.com/watch?v=7xZBS5K65EA>, (Oct. 25, 2016), 00:46 min.; 9 pgs.
"Australian Application Serial No. 2018236172, Response filed Jan. 18, 2021 to First Examination Report mailed Jun. 3, 2020", 17 pgs.
"Canadian Application Serial No. 3,055,941, Office Action mailed Dec. 3, 2020", 6 pgs.
"Canadian Application Serial No. 3,055,941, Response filed Apr. 6, 2021 to Office Action mailed Dec. 3, 2020", 21 pgs.
"European Application Serial No. 17778014.5, Communication Pursuant to Article 94(3) EPC mailed Mar. 14, 2023", 7 pgs.
"European Application Serial No. 17778014.5, Communication Pursuant to Article 94(3) EPC mailed Jun. 3, 2022", 7 pgs.
"European Application Serial No. 17778014.5, Communication Pursuant to Article 94(3) EPC mailed Dec. 4, 2023", 7 pgs.
"European Application Serial No. 17778014.5, Communication pursuant to Rule 164(2)(b) and Article 94(3) EPC mailed Sep. 7, 2020", 11 pgs.
"European Application Serial No. 17778014.5, Response filed Oct. 13, 2022 to Communication Pursuant to Article 94(3) EPC mailed Jun. 3, 2022", 86 pgs.
"European Application Serial No. 18717148.3, Communication Pursuant to Article 94(3) EPC mailed Mar. 17, 2023", 7 pgs.

(56) References Cited

OTHER PUBLICATIONS

"European Application Serial No. 18717148.3, Summons to Attend Oral Proceedings mailed Oct. 18, 2023", 6 pgs.

"Knee Version 3.1 Software User Guide Revision 1.1", Brainlab, [Online]. Retrieved from the Internet: <URL: www.brainlab.com/wp-content/uploads/2016/12/Knee3-Software-UserGuide.pdf>, (Dec. 31, 2015), 1-122.

"Software-Guided Knee Surgery-Balance in Motion", Brainlab, [Online] Retrieved from the Internet: <URL: https://www.youtube.com/watch?v=m8YPSSpPsiw>, (Jul. 19, 2017), 03:32 min; 56 pgs.

U.S. Appl. No. 17/876,918, filed Jul. 29, 2022, Surgical Field Camera System That Only Uses Images From Cameras With an Unobstructed Sight Line for Tracking.

"U.S. Appl. No. 17/876,918, Non Final Office Action mailed Mar. 14, 2024", 35 pgs.

"U.S. Appl. No. 17/876,918, Final Office Action mailed Oct. 7, 2024", 36 pgs.

"European Application Serial No. 17778014.5, Response Filed Apr. 3, 2024 to Communication Pursuant to Article 94(3) EPC mailed Dec. 4, 2023", 22 pgs.

"European Application Serial No. 18717148.3, Response Filed Mar. 28, 2024 to Summons to Attend Oral Proceedings mailed Oct. 18, 2023", 61 pgs.

"European Application Serial No. 18717148.3, EPO Written Decision to Refuse mailed May 16, 2024", 14 pgs.

"U.S. Appl. No. 17/876,918, Response filed Jun. 14, 2024 to Non Final Office Action mailed Mar. 14, 2024", 10 pgs.

"U.S. Appl. No. 17/876,918, Response filed Jan. 7, 2025 to Final Office Action mailed Oct. 7, 2024", 11 pgs.

"U.S. Appl. No. 17/876,918, Non Final Office Action mailed Feb. 28, 2025", 39 pgs.

"U.S. Appl. No. 17/876,918, Response filed May 15, 2025 to Non Final Office Action mailed Feb. 28, 2025", 14 pgs.

\* cited by examiner

AUGMENTED REALITY SURGICAL TECHNIQUE GUIDANCE

CLAIM OF PRIORITY

This application claims the benefit of priority to U.S. Provisional Applications Nos. 62/395,591, filed Sep. 16, 2016, titled "Implant Inventory Management Using Augmented Reality"; and 62/470,690, filed Mar. 13, 2017, titled "Augmented Reality Surgical Technique Guidance", each of which is hereby incorporated herein by reference in its entirety.

BACKGROUND

Orthopedic surgical technique instructions today are typically printed onto a booklet or are available in a computer file where the surgical steps are described with pictures, images or sketches that illustrate the surgical steps throughout a given procedure. Oftentimes it is hard for surgical assistants or physicians assistants to identify a proper instrument to be used during various parts of the surgical procedure. The assistants must then search through instrument trays causing the procedure to be inefficient.

It is common for instruments to need to be assembled and the assembly instructions are likely to not be available during a surgery. These instructions are sometimes communicated by a sales representative by describing what needs to be done, which may occur months before a given surgery. Other times, sales representatives may be on hand and may need to use a laser pointer to identify an instrument. However, laser pointers are not allowed or desirable in the surgical field of the operation.

Surgical advancements have allowed surgeons to use preoperative planning, display devices within a surgical field, optical imaging, and guides to improve surgical outcomes and customize surgery for a patient. While these advances have allowed for quicker and more successful surgeries, they ultimately rely on physical objects, which have costs and time requirements for manufacturing and configuration. Physical objects and devices may also obstruct portions of a surgical field, detracting from their benefits.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Systems and methods for using an augmented reality device during a surgical procedure are described herein. The systems and methods herein describe uses for the augmented reality device, such as to display virtual components or representations of real objects overlaid on a real environment. An augmented reality (AR) device allows a user to view displayed virtual objects that appear to be projected into the real environment, which is also visible. AR devices typically include two display lenses or screens, including one for each eye of a user. Light is permitted to pass through the two display lenses such that aspects of the real environment are visible while also projecting light to make virtual elements visible to the user of the AR device.

Two or more AR devices may be used in a coordinated manner, for example with a first AR device controlling one or more additional AR devices, or in a system with defined roles. For example, when activating an AR device, a user may select a role (e.g., surgeon, surgical assistant, nurse, etc., during a surgical procedure) and the AR device may display information relevant to that role. For example, a surgical assistant may have a virtual representation of an instrument displayed that the surgeon needs to perform a step of a surgical procedure.

Figure 1:
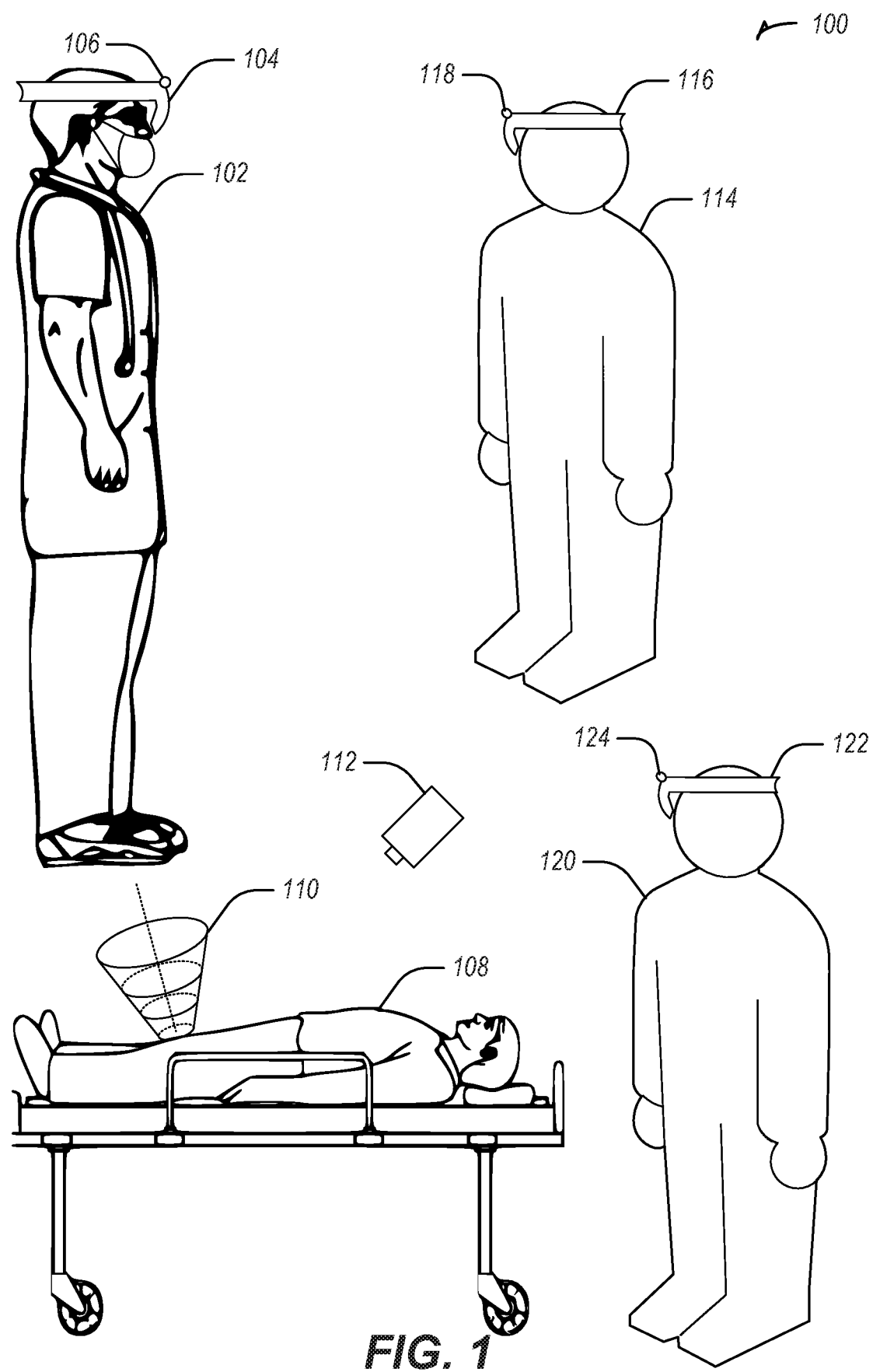
FIG. 1 illustrates surgical field in accordance with some embodiments.

FIG. 1 illustrates surgical field 100 in accordance with some embodiments. The surgical field 100 is illustrated in FIG. 1 including a surgeon 102, a patient 108, and may include a camera 112. The surgeon 102 is wearing an augmented reality (AR) device 104 which may be used to display a virtual object 110 to the surgeon 102. The virtual object 110 may not be visible to others within the surgical field 100 (e.g., surgical assistant 114 or nurse 120), though they may wear AR devices 116 and 122 respectively. Even if another person is viewing the surgical field 100 with an AR device, the person may not be able to see the virtual object 110 or may be able to see the virtual object 110 in a shared augmented reality with the surgeon 102, or may be able to see a modified version of the virtual object 110 (e.g., according to customizations unique to the surgeon 102 or the person) or may see different virtual objects entirely. Augmented reality is explained in more detail below.

Augmented reality is a technology for displaying virtual or "augmented" objects or visual effects overlaid on a real environment. The real environment may include a room or specific area (e.g., the surgical field 100), or may be more general to include the world at large. The virtual aspects overlaid on the real environment may be represented as anchored or in a set position relative to one or more aspects of the real environment. For example, the virtual object 110 may be configured to appear to be resting on a table. An AR system may present virtual aspects that are fixed to a real object without regard to a perspective of a viewer or viewers of the AR system (e.g., the surgeon 102). For example, the virtual object 110 may exist in a room, visible to a viewer of the AR system within the room and not visible to a viewer of the AR system outside the room. The virtual object 110 in the room may be displayed to the viewer outside the room when the viewer enters the room. In this example, the room may act as a real object that the virtual object 110 is fixed to in the AR system.

The AR device 104 may include one or more screens, such as a single screen or two screens (e.g., one per eye of a user). The screens may allow light to pass through the screens such that aspects of the real environment are visible while displaying the virtual object 110. The virtual object 110 may be made visible to the surgeon 102 by projecting light. The virtual object 110 may appear to have a degree of transparency or may be opaque (i.e., blocking aspects of the real environment).

An AR system may be viewable to one or more viewers, and may include differences among views available for the one or more viewers while retaining some aspects as universal among the views. For example, a heads-up display may change between two views while virtual objects may be fixed to a real object or area in both views. Aspects such as a color of an object, lighting, or other changes may be made among the views without changing a fixed position of at least one virtual object.

A user may see the virtual object 110 presented in an AR system as opaque or as including some level of transparency. In an example, the user may interact with the virtual object 110, such as by moving the virtual object 110 from a first position to a second position. For example, the user may move an object with his or her hand. This may be done in the AR system virtually by determining that the hand has moved into a position coincident or adjacent to the object (e.g., using one or more cameras, which may be mounted on an AR device, such as AR device camera 106 or separate, and which may be static or may be controlled to move), and causing the object to move in response. Virtual aspects may include virtual representations of real world objects or may include visual effects, such as lighting effects, etc. The AR system may include rules to govern the behavior of virtual objects, such as subjecting a virtual object to gravity or friction, or may include other predefined rules that defy real world physical constraints (e.g., floating objects, perpetual motion, etc.). An AR device 104 may include a camera 106 on the AR device 104 (not to be confused with the camera 112, separate from the AR device 104). The AR device camera 106 or the camera 112 may include an infrared camera, an infrared filter, a visible light filter, a plurality of cameras, a depth camera, etc. The AR device 104 may project virtual items over a representation of a real environment, which may be viewed by a user.

The AR device 104 may be used in the surgical field 100 during a surgical procedure, for example performed by the surgeon 102 on the patient 108. The AR device 104 may project or display virtual objects, such as the virtual object 110 during the surgical procedure to augment the surgeon's vision. The surgeon 102 may control the virtual object 110 using the AR device 104, a remote controller for the AR device 104, or by interacting with the virtual object 110 (e.g., using a hand to "interact" with the virtual object 110 or a gesture recognized by the camera 106 of the AR device 104). The virtual object 108 may augment a surgical tool. For example, the virtual object 110 may appear (to the surgeon 102 viewing the virtual object 110 through the AR device 104) to be coupled with or remain a fixed distance from the surgical tool. In another example, the virtual object 110 may be used to guide the surgical tool, and may appear to be fixed to the patient 108. In certain examples, the virtual object 110 may react to movements of other virtual or real-world objects in the surgical field. For example, the virtual object 110 may be altered when a surgeon is manipulating a surgical instrument in proximity to the virtual object 110.

The surgical assistant 114 may be presented with a virtual instrument through the AR display 116. The surgical assistant 114 may select a surgical instrument corresponding to the virtual instrument, which may be detected by a detection device, such as an AR camera 118. After detecting that the surgical instrument has been identified, selected, or moved by the surgical assistant 114, the AR display 116 may cease display of the virtual instrument. In an example, the surgeon 102 or the nurse 120 may cause an instruction to be sent to the AR device 116 of the surgical assistant 114 to display the virtual instrument. In an example, the nurse 120 may see virtual objects relevant to performing nurse (surgical assistant) types duties in the surgical field. The surgeon 102 may see virtual objects relevant to performing surgical duties in the surgical field.

Figure 2A:
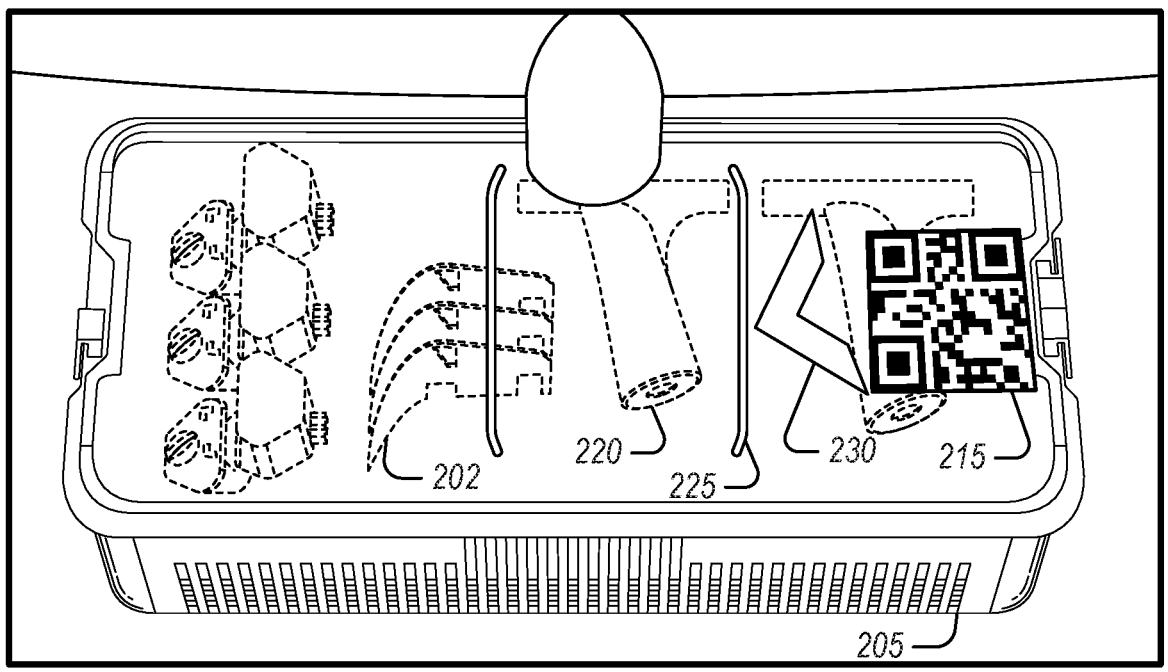
FIG. 2A illustrates an augmented reality (AR) display showing an instrument box in accordance with some embodiments.

FIG. 2A illustrates an AR display 200A showing an instrument box in accordance with some embodiments. AR display 200A includes a physical surgical instrument case 205 and virtual representation of a surgical instruments 202. The virtual representation of the surgical instruments 202 may be shown to a surgical assistant in order to identify a physical surgical instrument to be retrieved for use in a surgical procedure. In an example, the virtual representation of a surgical instrument 202 may include an image shown in the AR display 200A, for example appearing to float in front of a field of vision of the surgical assistant. The image may be static or may be manipulated virtually (e.g., using a gesture), such as to rotate, move, or zoom in or out on the virtual representation of a surgical instrument 202.

In an example, the virtual representation of a surgical instrument 202 may include a particular location in the AR display 200A. For example, the virtual representation of a surgical instrument 202 may hover over the case 205 or tray containing the physical surgical instrument (corresponding to the virtual representation of the surgical instrument 202). In an example, the case 205 may be sealed (e.g., sterilized) and may contain the physical surgical instrument. The case 205 may have an identification component 215 (e.g., a barcode, a QR code, a radio frequency identification (RFID) tag, etc.) to identify that the case 205 contains the physical surgical instrument. The identification component 215 may be used to identify the surgical instrument using a detection device (e.g., a camera, a scanner, an RFID reader, etc.). Using the identification, the AR display 200A may automatically place the virtual representation of the surgical instrument 202 over, within, or on the case 205. In an example, the AR display 200A may appear to project the virtual representation of a surgical instrument 202 within the case 205, though the box 205 is still closed. In an example, the identification component 215 may be scanned to cause contents of the case 205 to be displayed virtually (e.g., while retaining sterility of the instruments in the case 205).

In an example, the AR display 200A may direct a surgical assistant to a specific virtual surgical instrument 220 by highlighting the virtual instrument 220, such as using virtual brackets 225 around the virtual surgical instrument 220 or pointing at it with a virtual arrow 230. In an example, when the case 205 is opened or the surgical instrument is selected, the virtual representation of the surgical instrument 202 may be removed from the AR display 200A.

A surgical procedure may use tools, instruments, implants, or securing devices (e.g., a pin, a screw, etc.). In an example, some items used in the surgical procedure may be stored in a sterile sealed case (e.g., case 205) until the surgery begins or shortly before. To maintain sterilization, the case 205 may be placed have its contents concealed.

A sterile sealed surgical case 205 may contain many different types of items, depending on the surgery being performed. For example, a surgery may involve an orthopedic implant, such as a new hip joint, so the case may contain the hip implant and the tools necessary for the implant surgery. The tools and the implant may each be contained in separate cases. If an implant or device is being secured to a bone, a set of screws may be required for the surgery, with those screws contained in another separate sterile case. For other non-implant surgeries, only tools and instruments may be contained in sterile sealed cases. Depending on the needs of the surgery, tools may be separated into different cases based on the type of tool or surgical step order. In a surgical field, a surgeon, nurse, or surgical technician may be presented with multiple sterile cases, each with few identifying marks about the contents of the case.

An identifying marker or label (e.g., the identification component 215) may be placed on the outside of the case, package, or tray. The case may also have a wireless transceiver placed on the outside or inside of the case. A sensor may be used to read the identification component 215 or communicate with the transceiver to identify the case. The sensor may be part of a reader or scanner with network electronic communication capabilities, either wired or wireless, to transmit the identity of the case to a computer system. The computer system may be connected to a server or database. The identity of the case may be determined by querying the database. Properties of the case 205 may be retrieved from the database, such as the contents of the case 205, the surgery it is intended for, how the case was packaged, when it was packaged, or the like. The database may contain information about an identity of a patient, medical data for the patient, or specific details about an implant. The database may contain images or three-dimensional representations of the items contained within the case 205. The database may contain a layout of an item, such that a virtual representation of the inside of the case 205 may be created using the image or the three-dimensional representations of the item.

When an operator views the case 205 with an AR device, an image of the layout of the inside of the case 205 may be displayed on an AR display of the AR device. The operator may be presented with a textual list of the items contained within the case. The operator may be presented with logistical information, such as the patient's name, the identity of other cases needed for the operation, the date, time, and location of the operation, or the names of any doctors or nurses scheduled for the operation. The case content images and listing may be displayed above the case or to the side. An image of an item, such as an implant, may also be presented over the identification component 215 on the case.

A three-dimensional representation of an item in the case 205, such as an implant, may be displayed to the operator on an AR display of the AR device. The operator may manipulate the three-dimensional representation, such as by virtually "picking it up", rotating it, moving it, or scaling it. The AR device may detect fingers or a hand of the operator for such manipulation, or the operator may use a connected component such as a controller or glove to perform the manipulation.

In an example, the case 205 may be stored in a designated storage area with similar cases for surgical operations. A logistical tracking and storage system may include information for the location of each case. The case 205 may be identified by a case identifier or identifying information for an operation using the case 205. An operator with an AR device may be tasked with retrieving a case for an operation. The AR device may be connected by a network to a logistical tracking and storage system (e.g., a database or a service). The operator may provide identifying information for the case 205 to be retrieved, such as a case identifier or a surgical procedure identifier. The logistical tracking system may provide directions to the AR device for the operator to follow to locate the identified case in the storage area, and the directions may be displayed on an AR display of the AR device. In an example, the AR device has a positioning system, and the logistical tracking system may provide real time directions to be displayed on the AR display based on the position of the AR device in the storage area.

The directions provided to the AR device may be textual step-by-step instructions, a map identifying the case 205, or the like. In an embodiment, a three-dimensional environment may be viewed on the AR device with directions or information about the case 205. The directions may be displayed on the AR display such that the directions change or update based on changes or updates to a location of the AR device. When the operator reaches the case 205, the AR display may present a three-dimensional representation of contents of the case 205 or other cases nearby.

In an example, a camera, scanner, portion of the AR device, or the like may be used to scan of the identification component 215. The scanned information may be used to query a database to provide data to the AR device such as a date, time, and location of the operation, patient information, case information, or the like. The database may include set up instructions for the assembly or proper preparation techniques for items in the case 205 or the case 205 itself. The assembly or preparation techniques may include surgeon-specified instructions. The assembly, techniques, or instructions may be displayed to the operator on the AR display.

The AR device may be used to assist the operator with the maintenance of the items in the case. When the identification component 215 on the case 205 or an individual item identifier in the case 205 is scanned, the AR device may display an image or text providing instructions for assembly, disassembly, cleaning, lubrication, or the like for an item within the case 205. In an example, a warnings or a caution icon may be displayed to the operator for awareness of dangerous or pertinent steps. The operator may interact with the AR device, for example, by cycling through steps to view each step of a procedure.

As previously noted, the case 205 may be covered or be very similar in appearance to other cases, and may be kept sealed to remain sterile. When a surgical procedure room is prepared for a surgery, the necessary cases are moved into the room. A operator may be tasked with registering each of the cases as part of the surgical procedure preparation such that needed or potentially needed items, such as tools, are placed in the room before the surgical procedure begins.

An operator employed to set up a surgical procedure room may be directed, using an AR device, to place cases within the room. The operator may scan the identification component 215 for the case 205, and in response, data related to a surgical procedure may be retrieved from a database, such as based on the identification of the case 205. Utilizing location tracking sensors or a tracking camera system, the operator may be provided directions, such as through the AR display, to the appropriate location for the case 205. The AR display may display a virtual image of the case 205 in the intended location and position, such that the operator can see how and where the case should be placed. In an example, the AR display may detect (e.g., using a camera) when the operation has matched or substantially matched the placement of the case 205 with the virtual image displayed.

The contents of some cases may require assembly before a surgical procedure begins. The operator may be prompted on the AR display with instructions for opening the case and locating pieces for the item to be assembled. The AR display may present three-dimensional representations of the pieces or the location of the pieces, such displaying a three-dimensional representation of the piece above where the piece is physically located. Through object recognition or scanning identification tags on a piece (e.g., a bar code, a QR code), the AR device may determine that all necessary pieces have been located. The AR display may present instructions for assembling the item. The instruction may include a list of textual steps, animations, video, or the like. The instructions may be animated steps using the three-dimensional representations of the pieces. When the operator completes the assembly, the AR display may provide a three-dimensional representation of the assembled item such that the operator may confirm the physical assembled item resembles the representation. The operator may then be provided instructions on the AR display for the placement of the assembled item with the surgical procedure room.

Similar to being tasked with assembling an item from contents contained in a case, an operator may be tasked with disassembling, cleaning, or lubricating items from a case, including repacking the case with the items or disassembled pieces of an item or discarding items that are one time use items. The operator may be provided instructions for these tasks on the AR display similar to the assembly instructions. In addition to instructions displayed to the operator, any warnings or precautions about the item being handled may be displayed.

After a surgical procedure room has been prepared and before a surgery begins, a surgeon or surgical assistant may perform an inspection of the surgical procedure room. The case 205 may be open such that it is ready for when the surgical procedure is to begin. The surgical assistant, utilizing an AR device, may scan the identification component 215 on the case 205 in the surgical procedure room. By scanning the identification component 215, two actions may occur. First, a confirmation may be made that the case 205 is to be used for the surgical procedure. In an example, the AR device may alert the surgical assistant if any necessary cases are not scanned. Second, using the case identifier, an inventory of the items in the case 205 may be retrieved, such as from a database. The inventory may include three-dimensional representations of the contents and identifying information for the contents, such as the name of the intended patient, procedure information, or other patient related information. The surgical assistant may then be presented with a display on the AR device of the intended inventory of the case. The surgical assistant, viewing both the actual contents of the case and the virtual representations of the case contents on the AR headset display may inspect the case contents and confirm the intended case contents are physically present. The confirmation step for the surgical assistant may include inspecting an item for proper assembly. The system may recognize a surgical assistant inspection is occurring and provide the surgical assistant's AR device with a three-dimensional representation of the assembled item instead of the pieces or assembly instructions a previous operator may have had displayed.

During a surgical procedure involving the case 205 (or during a surgical training procedure), an operator, such as a surgeon or nurse, may utilize an AR device. The AR device may allow the operator to see virtual representations while still viewing the surgical operation and the surgical field. In an embodiment, the AR device may have a camera attached to capture the identification component 215, such as a QR code. The AR device may transmit identification information to a computer system connected to an itemized case database and receive information for the identified case 205. When the operator views the case 205 with the AR device, an image of the layout of the inside of the case 205 may be displayed. In an example, the operator may be presented with one of, or a combination of, a list of the items within the case, images, or three-dimensional representations of the items within the case 205. The case 205 may contain more items than necessary for the surgical procedure being performed, and the system may display to the operator only the items in the case 205 necessary for the operation. The subset of items necessary for the operation may be the only items displayed to the operator instead of displaying all the items contained within the case 205. For example, the AR display may present all items within the case 205, but differentiate the necessary items from the unnecessary items, such as the necessary items being colored green and the unnecessary items being colored red.

Figure 2B:
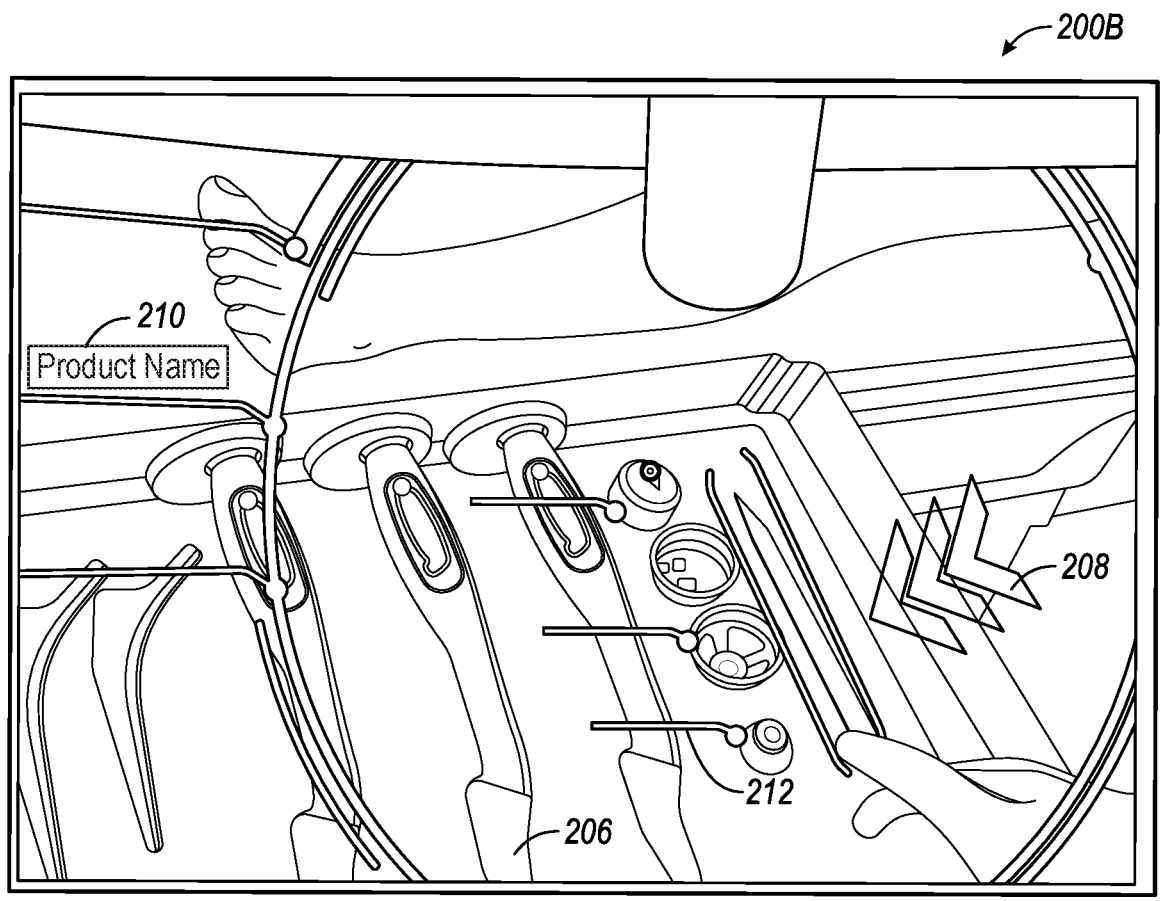
FIG. 2B illustrates an AR instrument identification display in accordance with some embodiments.

FIG. 2B illustrates an augmented reality (AR) instrument identification display 200B in accordance with some embodiments. The AR instrument identification display 200B includes a surgical instrument 206, a virtual indicator 208, and may include additional information 210, such as patient or procedure information. The virtual indicator 208 may be used to identify the surgical instrument 206 that corresponds to a procedure being performed. The virtual indicator 208 may include moving lights, flashing lights, color or changing color lights, or other virtual effects. The additional information 210 may for example, name or provide other information about the surgical instrument 206. The virtual indicator 208 may be added to the AR display 200B in response to a surgeon selection identifying a need for the surgical instrument 206. In an example, when the surgical instrument 206 is or has been moved, selected, or the surgical assistant otherwise indicates that it has been located or identified (or if the surgeon indicates it is no longer needed), the virtual indicator 208 may be removed from the AR display 200B. In an example a virtual indicator 212 may be used to identify an item. A user of the AR device used to present the AR display 200B may interact with the virtual indicator 208, for example by placing a finger, hand, or item adjacent to or appearing to occupy the same space as the virtual indicator 208. In response, the virtual indicator 208 may perform an action, such as displaying information about the item represented by the virtual indicator 208 (e.g., a name of the item, whether the item is a one-time use item or can be resterilized, whether the item is fragile, whether the item is a patient-specific or personalized item, what procedure the item is to be used for, or the like).

Figure 3:
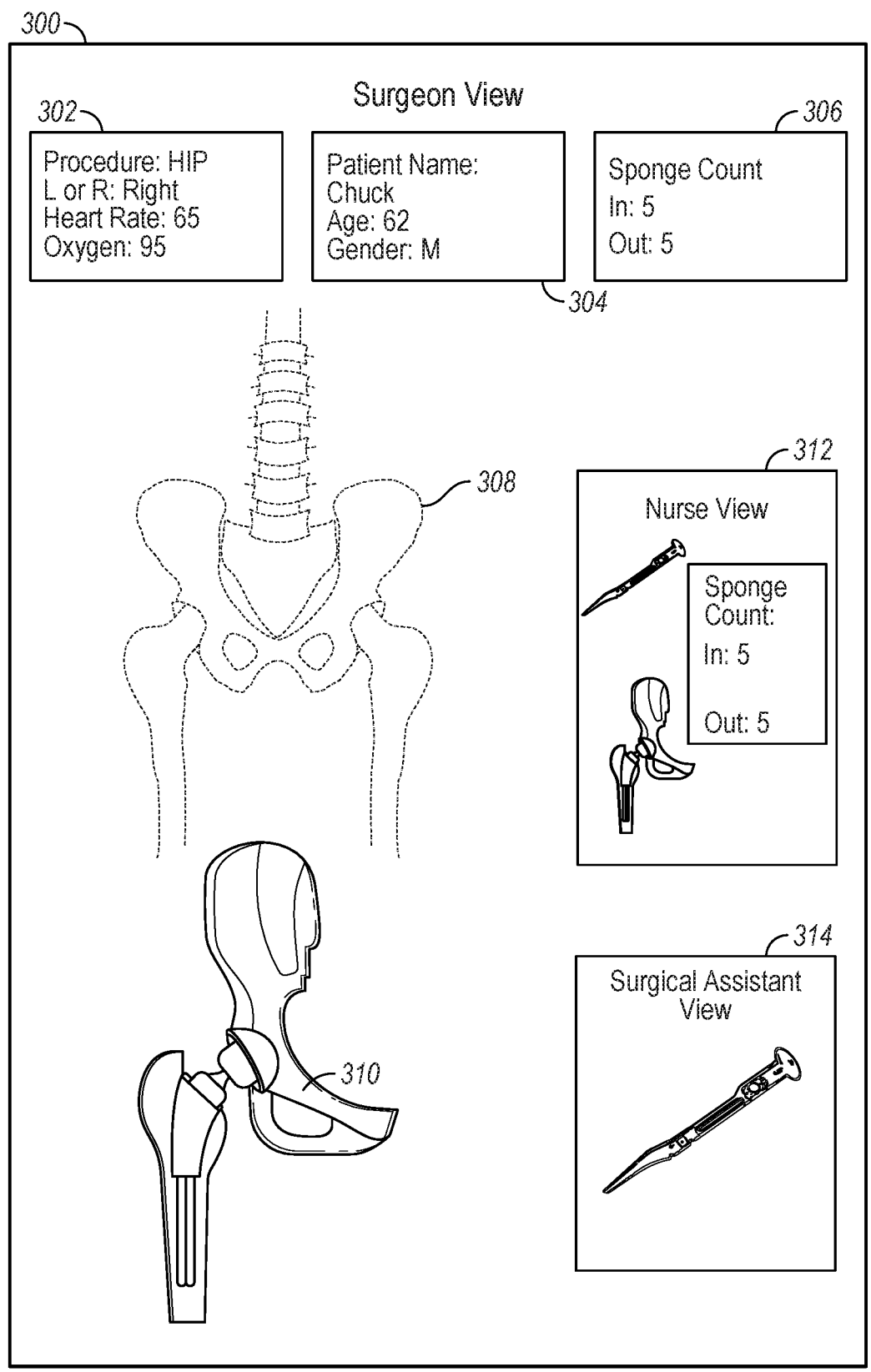
FIG. 3 illustrates an example augmented reality display for a surgeon in accordance with some embodiments.

FIG. 3 illustrates an example augmented reality display 300 for a surgeon in accordance with some embodiments. The AR display 300 may include one or more information user interfaces, such as UIs 302-306. The AR display 300 includes a virtually displayed patient image 308, which may be displayed projected on a patient (e.g., a skeleton overlaid on the patient). The AR display 300 includes a virtual representation 310, such as of patient anatomy with an implant. The virtual representation 310 and the patient image 308 may be superimposed and displayed overlaid on the patient. For example, the surgeon may alternate between viewing the anatomy via the patient image 308 and the virtual representation 310, or may switch both off to view the patient without any virtual projections. The virtual representation 310 may be modified by the surgeon, such as to adjust the size or position of the implant with respect to the anatomy of the patient (either as viewed on the patient or from the patient image 308).

The information UIs 302-306 may include a procedure information UI 302, a patient information UI 304, or an active count UI 306. These UIs 302-306 may be displayed as virtual components in a heads-up portion of the AR display 300. In an example, during a surgical procedure, the active count UI 306 may be used to monitor surgical instruments, sponges, gauze, or other materials used during the surgical procedure. For example, the AR display 300 may be in communication with one or more cameras (e.g., a camera on an AR device including the AR display 300, or a remote camera) or one or more other detection devices. A detection device may be used to track the surgical instruments, sponges, gauze, etc. during the surgical procedure. A count of these may be shown on the active count UI 306. The active count UI 306 may allow a surgeon to easily see whether all items are accounted for, such as before finishing the surgical procedure (e.g., before closing the patient). In another example, the active count UI 306 may include a tracked cement mixing time, exposure time, or the like. The surgeon may be presented with a "start" button for the timers within the active count UI 306. The countdown timer may be used to track time for cement open, mixing, exposure, time to body, etc. In another example, information typically displayed on a whiteboard in an operating room may be displayed in one of the UIs 302-306. Another counter may track a number of times a door has been opened and the counter may displayed in a UI. Tracked information may be downloaded or saved into a patient file (e.g., an electronic medical record). A camera of the AR display may detect whether a procedure is being conducted or is about to be conducted on a left or right anatomy of a patient. The AR display may display a verification that the surgeon is operating on the proper anatomy (e.g., right knee versus left knee) or may display or issue an alert if the wrong anatomy is identified.

In the event that a count indicates a missing item, the AR display 300 may be used to identify a last-identified location of the item. For example, if a detection device identifies that a piece of gauze has fallen on the floor and a person is standing on the gauze, the area around the person's foot may be highlighted or lit up in the AR display 300. In another example, if a sponge is in the patient, the location within the patient may be identified using the AR display 300. This may help preventing leaving items in a patient. An alert may be displayed to the surgeon (or the surgical team in general) when a count does not match up. The AR display 300 may display the alert or the alert may be audible or haptic. The AR display 300 may display likely locations of items that may be missing. In an example, an AR display of a surgical assistant or item counter may include a virtual identification representations of all items, a set of items, any items likely to be missed, or all items within a patient. That AR display may then maintain virtual identification of the items until the procedure ends, or until the items are removed.

In an example, the AR display 300 may include sample displays of other team members, such as a nurse display 312 or a surgical assistant display 314. In an example, the surgeon using the AR display 300 may identify a surgical instrument to be used and virtually drag the surgical instrument from a selection location to the surgical assistant display 314 (or may select the surgical instrument from within the surgical assistant display 314). A virtual representation of the surgical instrument may then be displayed in the surgical assistant display 314 automatically. In this way, the surgeon may use the AR display 300 to control other AR displays (e.g., using a gesture or a voice command), or the AR display 300 and the other AR displays may be synchronized. In an example, the nurse display 312 may show the virtual representation 310, which may be automatically updated in the nurse display 312 in response to changes made in the AR display 300 (or vice versa).

Figure 4A:
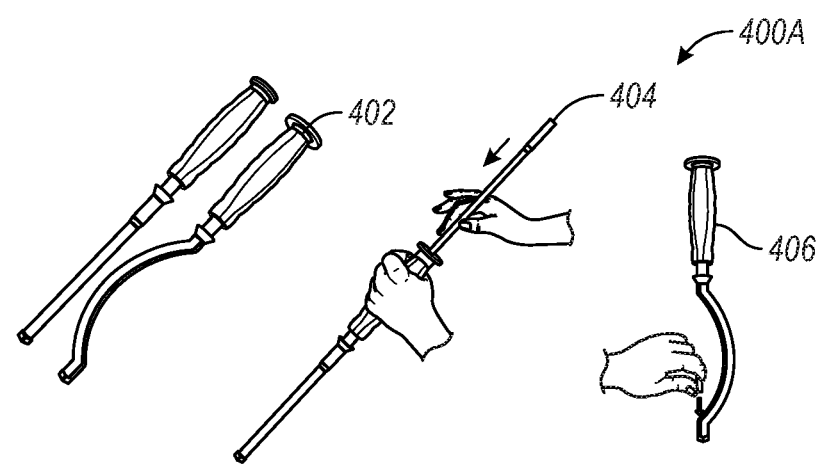
FIGS. 4A-4C illustrate augmented reality surgical instrument assembly displays in accordance with some embodiments.
Figure 4B:
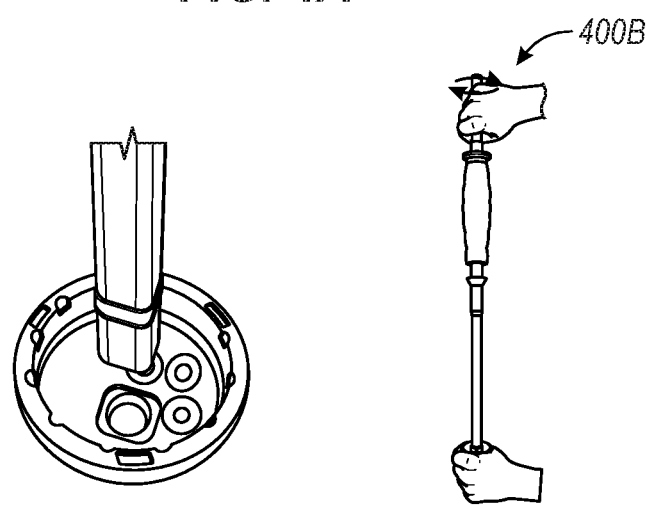
Figure 4C:
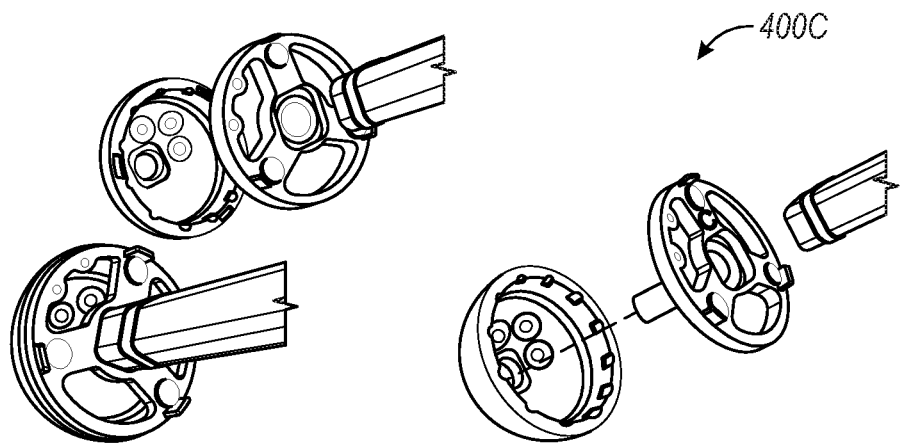

FIGS. 4A-4C illustrate augmented reality surgical instrument assembly displays 400A-400C in accordance with some embodiments. The AR displays 400A-400C may be used to present virtual representations of portions of a surgical instrument for assembly instructions. For example, FIG. 4A illustrates a series of virtual representations. For example, a first virtual representation 402 illustrates instruments to be assembled. A second virtual representation 404 illustrates a first action to assemble one of the instruments. A third virtual representation 406 illustrates a second action to assemble another of the instruments. The AR display 400A may present each of the virtual representations 402-406, for example in order, such that the corresponding surgical instruments may be assembled. In an example the virtual representation 406 may be displayed after a detection device identifies that an assembly operation corresponding to the virtual representation 404 has been completed (e.g., by a user viewing the AR display 400A). The virtual representations 402-406 may proceed automatically as corresponding assembly is completed for a real surgical instrument, or a surgeon may cause (e.g., by selecting a virtual user indication or performing a gesture) a red light or green light (or other visual indicator) of whether to proceed, to be displayed. The AR displays 400B and 400C illustrate other techniques that may be illustrated using virtual representations to allow a user to assemble an instrument. Other techniques or assembly of instruments may be displayed using virtual representations. The AR displays 400A-400C may include animation or video to illustrate assembly instructions.

Figure 5:
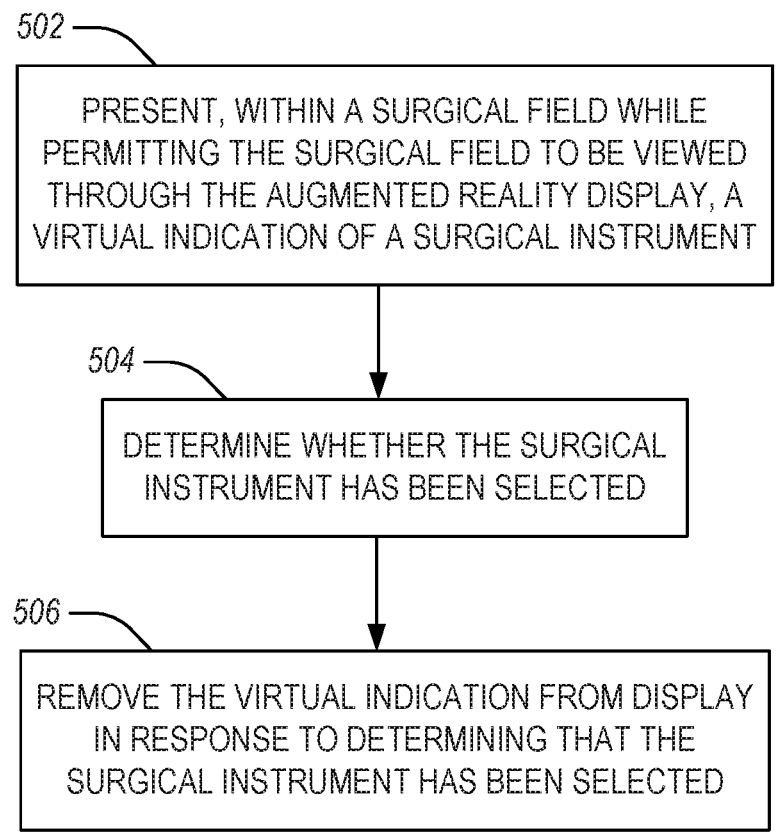
FIG. 5 illustrates a flow chart showing a technique for surgical instrument identification using an augmented reality display in accordance with some embodiments.

FIG. 5 illustrates a flow chart showing a technique 500 for surgical instrument identification using an augmented reality display in accordance with some embodiments. The technique 500 includes an operation 502 to present, within a surgical field while permitting the surgical field to be viewed through the augmented reality display, a virtual indication of a surgical instrument. The technique 500 includes an operation 504 to determine whether the surgical instrument has been selected. The technique 500 includes an operation 506 to remove the virtual indication from display in response to determining that the surgical instrument has been selected.

The technique 500 may include an operation to identify the surgical instrument from at least one of: a plurality of surgical instruments, a box including the surgical instrument, a tray including the surgical instrument, or the like. The detection device may include a camera, an optical imaging device, an electronic identification device (e.g., RFID or barcode reader), or the like. In an example utilizing a camera (integrated into the AR device or a stand-alone camera), the camera may identify an instrument through shape recognition or through identification of an identification mark, such as a QR code or similar two or three dimensional mark. The technique 500 may include using a proximity detector (e.g., RFID, NFC, Bluetooth, etc.), a motion sensor, a button on the surgical instrument, or the like to identify the surgical instrument. In an example, the technique 500 may include using the AR device to notify a second AR device to instruct a user to obtain the surgical instrument (e.g., using the second AR device), or to alert a user that the surgical instrument has been obtained (e.g., using the second AR device). The technique 500 may include displaying a portion of a view from a second augmented reality device (e.g., including virtually displayed components).

The technique 500 may include displaying patient or procedure information, for example in a heads-up portion of the AR display. In an example, a series of virtual components may be presented, such as to provide instruction for assembly of the surgical instrument. The series of virtual components may be displayed in progression automatically, such as in response to detecting (e.g., automatically using a detection device or from a user input) that an operation corresponding to one of the series of virtual components is complete. The system may be able to automatically detect the different instruments being used during a procedure by shape recognition, RFID tags, bar codes, or similar tagging or recognition methods.

In an example, a technique may present a virtual indication of a surgical instrument and remove the indication when the a surgical step has been completed. For example, the technique may include an operation to identify (e.g., using a processor) a surgical procedure including a plurality of surgical steps. The plurality of surgical steps may be ordered or unordered or may include partial orders. The technique may include an operation to determine, from the surgical procedure, a surgical instrument needed for a surgical step of the plurality of surgical steps. The technique may include an operation to present, using an augmented reality display of the augmented reality device, overlaid on a view of the surgical field while permitting the surgical field to viewed through the augmented reality display, a virtual representation of the surgical instrument. The technique may include an operation to determine whether the surgical step has been completed. In response to determining that the surgical step has been completed, the technique may include presenting using an augmented reality display of the augmented reality device, within the surgical field, a virtual representation of a second instrument for a second surgical step of the plurality of surgical steps.

In an example, the technique may include identifying the second surgical step based on identifying a visual or audio indication. For example the visual indication may include a detected gesture (e.g., a surgeon hand gesture), a visual detection that the surgical instrument has been moved or placed in a particular position or area, or the like. The audio indication may include a spoken comment recognized via a microphone, a tone sounding, or the like.

The technique may include determining whether the surgical instrument is needed in a later surgical step of the plurality of surgical steps. In response to determining that the surgical instrument is needed in the later surgical step, displaying an indication (e.g., a virtual indication, an indication on a user interface, etc.) that the surgical instrument is needed in the later surgical step. In another example, an audio indication or a haptic indication may be used instead of or in addition to the displayed indication.

Figure 6:
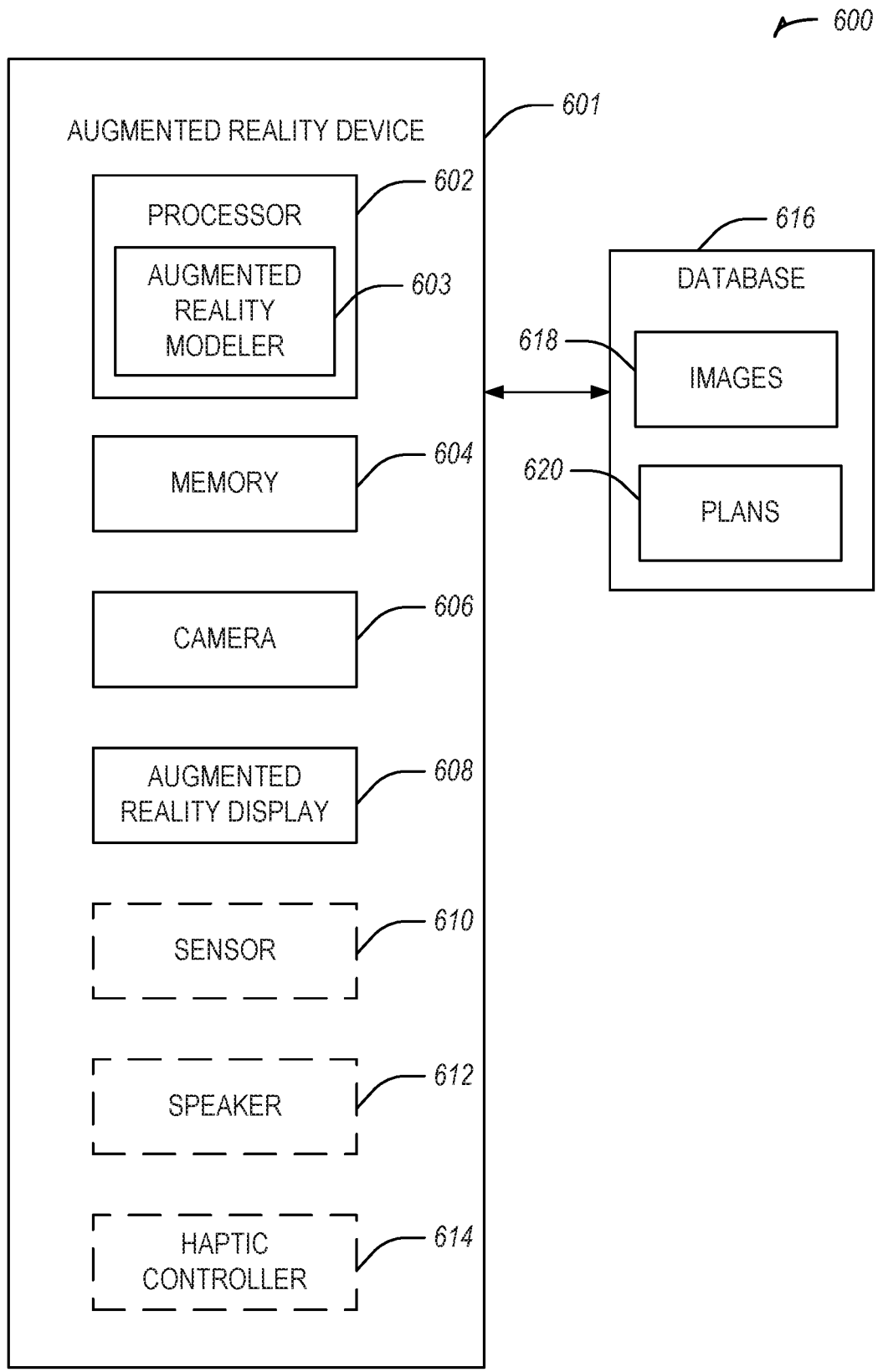
FIG. 6 illustrates a system for surgical instrument identification using an augmented reality display in accordance with some embodiments.

FIG. 6 illustrates a system 600 for surgical instrument identification using an augmented reality display in accordance with some embodiments. The system 600 may be used to perform the technique 500 described in relation to FIG. 5, for example, by using the processor 602. The system includes an augmented reality device 601 that may be in communication with a database 616. The augmented reality device 601 includes a processor 602, memory 604, an AR display 608, and a camera 606. The augmented reality device 601 may include a sensor 610, a speaker 612, or a haptic controller 614. The database 616 may include image storage 618 or preoperative plan storage 620. In an example, the augmented reality device 601 may be a HoloLens manufactured by Microsoft of Redmond, Washington.

The processor 602 of the augmented reality device 601 includes an augmented reality modeler 603. The augmented reality modeler 603 may be used by the processor 602 to create the augmented reality environment. For example, the augmented reality modeler 603 may receive dimensions of a room, such as from the camera 606 or sensor 610, and create the augmented reality environment to fit within the physical structure of the room. In another example, physical objects may be present in the room and the augmented reality modeler 603 may use the physical objects to present virtual objects in the augmented reality environment. For example, the augmented reality modeler 603 may use or detect a table present in the room and present a virtual object as resting on the table. The AR display 608 may display the AR environment overlaid on a real environment. The display 608 may show a virtual object, using the AR device 601, such as in a fixed position in the AR environment.

The augmented reality device 601 may include a sensor 610, such as an infrared sensor. The camera 606 or the sensor 610 may be used to detect movement, such as a gesture by a surgeon or other user, that may be interpreted by the processor 602 as attempted or intended interaction by the user with the virtual target. The processor 602 may identify an object in a real environment, such as through processing information received using the camera 606.

The AR display 608, for example during a surgical procedure, may present, such as within a surgical field while permitting the surgical field to be viewed through the augmented reality display, a virtual feature corresponding to a physical feature hidden by an anatomical aspect of a patient. The virtual feature may have a virtual position or orientation corresponding to a first physical position or orientation of the physical feature. In an example, the virtual position or orientation of the virtual feature may include an offset from the first physical position or orientation of the physical feature. The offset may include a predetermined distance from the augmented reality display, a relative distance from the augmented reality display to the anatomical aspect, or the like.

Figure 7:
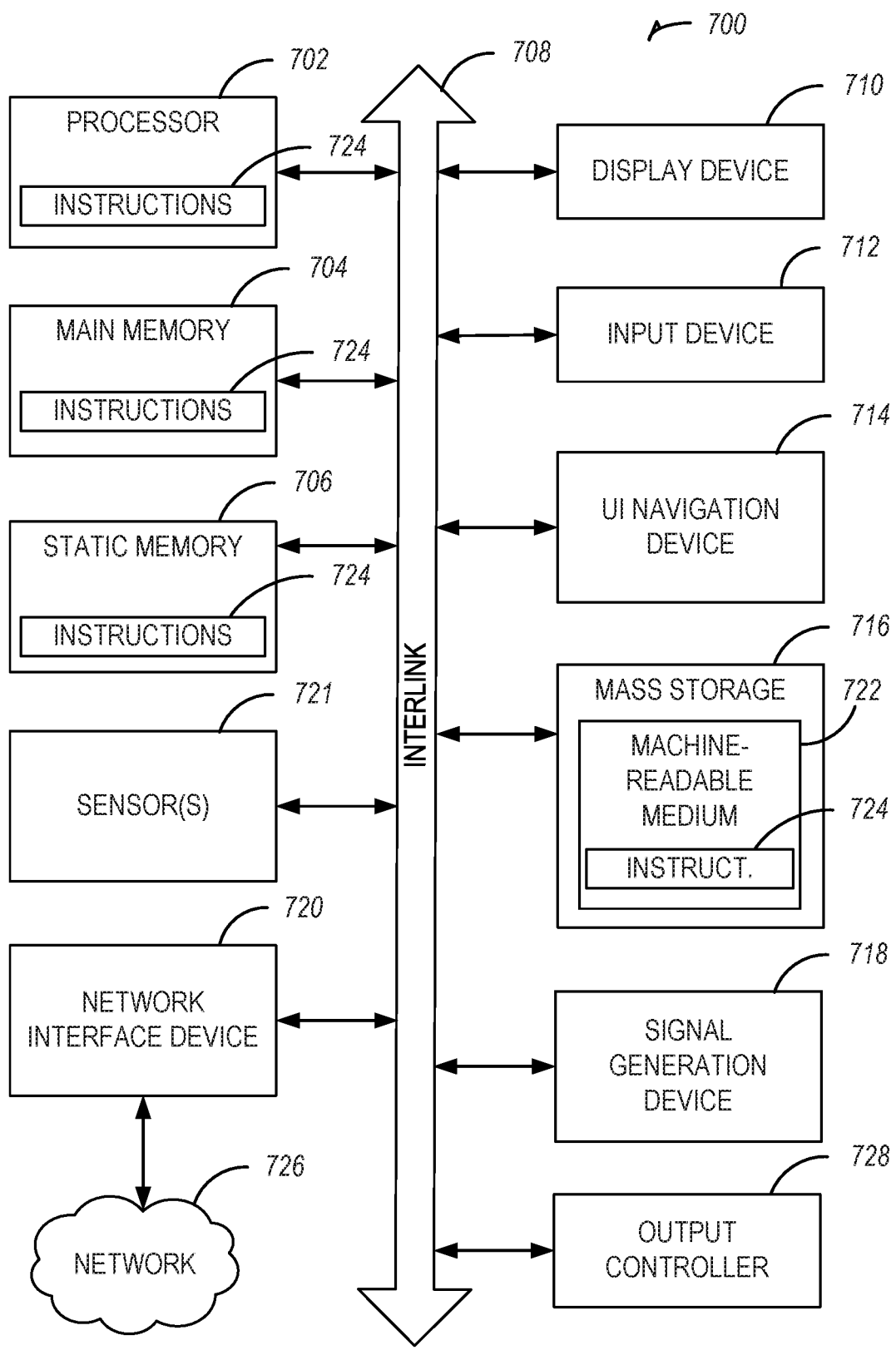
FIG. 7 illustrates generally an example of a block diagram of a machine upon which any one or more of the techniques discussed herein may perform in accordance with some embodiments.

FIG. 7 illustrates generally an example of a block diagram of a machine 700 upon which any one or more of the techniques (e.g., methodologies) discussed herein may perform in accordance with some embodiments. In alternative embodiments, the machine 700 may operate as a standalone device or may be connected (e.g., networked) to other machines. In a networked deployment, the machine 700 may operate in the capacity of a server machine, a client machine, or both in server-client network environments. The machine 700 may be a personal computer (PC), a tablet PC, a personal digital assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate on, logic or a number of components, modules, or like mechanisms. Such mechanisms are tangible entities (e.g., hardware) capable of performing specified operations when operating. In an example, the hardware may be specifically configured to carry out a specific operation (e.g., hardwired). In an example, the hardware may include configurable execution units (e.g., transistors, circuits, etc.) and a computer readable medium containing instructions, where the instructions configure the execution units to carry out a specific operation when in operation. The configuring may occur under the direction of the executions units or a loading mechanism. Accordingly, the execution units are communicatively coupled to the computer readable medium when the device is operating. For example, under operation, the execution units may be configured by a first set of instructions to implement a first set of features at one point in time and reconfigured by a second set of instructions to implement a second set of features.

Machine (e.g., computer system) 700 may include a hardware processor 702 (e.g., a central processing unit (CPU), a graphics processing unit (GPU), a hardware processor core, or any combination thereof), a main memory 704 and a static memory 706, some or all of which may communicate with each other via an interlink (e.g., bus) 708. The machine 700 may further include a display unit 710, an alphanumeric input device 712 (e.g., a keyboard), and a user interface (UI) navigation device 714 (e.g., a mouse). In an example, the display unit 710, alphanumeric input device 712 and UI navigation device 714 may be a touch screen display. The display unit 710 may include goggles, glasses, or other AR or VR display components. For example, the display unit may be worn on a head of a user and may provide a heads-up-display to the user. The alphanumeric input device 712 may include a virtual keyboard (e.g., a keyboard displayed virtually in a VR or AR setting.

The machine 700 may additionally include a storage device (e.g., drive unit) 716, a signal generation device 718 (e.g., a speaker), a network interface device 720, and one or more sensors 721, such as a global positioning system (GPS) sensor, compass, accelerometer, or other sensor. The machine 700 may include an output controller 728, such as a serial (e.g., universal serial bus (USB), parallel, or other wired or wireless (e.g., infrared (IR), near field communication (NFC), etc.) connection to communicate or control one or more peripheral devices.

The storage device 716 may include a machine readable medium 722 that is non-transitory on which is stored one or more sets of data structures or instructions 724 (e.g., software) embodying or utilized by any one or more of the techniques or functions described herein. The instructions 724 may also reside, completely or at least partially, within the main memory 704, within static memory 706, or within the hardware processor 702 during execution thereof by the machine 700. In an example, one or any combination of the hardware processor 702, the main memory 704, the static memory 706, or the storage device 716 may constitute machine readable media.

While the machine readable medium 722 is illustrated as a single medium, the term "machine readable medium" may include a single medium or multiple media (e.g., a centralized or distributed database, or associated caches and servers) configured to store the one or more instructions 724.

The term "machine readable medium" may include any medium that is capable of storing, encoding, or carrying instructions for execution by the machine 700 and that cause the machine 700 to perform any one or more of the techniques of the present disclosure, or that is capable of storing, encoding or carrying data structures used by or associated with such instructions. Non-limiting machine readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 724 may further be transmitted or received over a communications network 726 using a transmission medium via the network interface device 720 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, as the personal area network family of standards known as Bluetooth® that are promulgated by the Bluetooth Special Interest Group, peer-to-peer (P2P) networks, among others. In an example, the network interface device 720 may include one or more physical jacks (e.g., Ethernet, coaxial, or phone jacks) or one or more antennas to connect to the communications network 726. In an example, the network interface device 720 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 700, and includes digital or analog communications signals or other intangible medium to facilitate communication of such software.

Moving now to FIGS. 8-11, various surgical procedures are discussed with augmented reality assistance. An AR device may be used to direct an operator during a surgical procedure. The operator may wear an AR device includes a display screen which allows for the physical surgical field to be viewed through the display screen and a camera to detect what the operator is viewing and correlate the orientation of the images displayed on the display screen. The AR device may be connected through a network to a server and database. The database may contain the ordered steps for a surgical procedure and data for creating virtual representations of the actions associated with each step. An operator may select a surgical procedure from a plurality of surgical procedures. The plurality of surgical procedures may be displayed on the display screen or may be displayed on a separate monitor connected to the server. In certain examples, the surgical procedure is selected through patient identification (barcode scan RFID, etc. . . . ), as the patient is in the operating room for a particular procedure.

Before beginning the surgical procedure, the operator, wearing the AR device, may be tasked with performing steps to orient the AR device. The orientation tasks may include establishing the location of the operator in the surgical field, utilizing the camera or other sensors to record the position and orientation of the patient's body, and scanning one or more cases for the surgical procedure to register their presence in the surgical field and confirm their location is correct. The orientation tasks may assist the AR device with properly presenting images in a three-dimensional space to the operator and correctly position guidance information and images related to the positioning of the patient's body.

An operator may indicate with gestures visible to the AR device that the surgical procedure should begin. The operator may be presented on the display screen with textual instructions for a step of the surgical procedure. The display screen may present a virtual three-dimensional representation of the action to be performed for the step. The virtual three-dimensional representation may be animated to demonstrate the direction and force for the operator to employ. For example, the surgical procedure step may involve sawing part of a bone. The virtual three-dimensional representation may present an animation demonstrating the angle the saw should be placed and the amount of force to use. The display screen may also present any precautions and warnings about the surgical step to be performed. This may include reactions the operator should be aware of that may indicate a problem. When an instrument is involved with the surgical step, the operator may be required to register the instrument to confirm the operator is using the correct instrument for the surgical step. The registration of the instrument may be performed by having the camera of the AR device capture the instrument and transmit the captured image to the server and database to perform object recognition. The registration may also be performed by using the camera or a sensor to scan an identifying code on the instrument. When the operator registers a correct instrument, the display screen may continue with presenting the next step of the surgical procedure. In addition to registering the instrument, the AR device and camera may be utilize to confirm the instrument is in the correct position and orientation for the surgical step. Similar to the registration step, the camera may capture the instrument and send the captured image to the server and database for confirmation of the position and orientation. Should the instrument not be in the correct position and orientation, the display screen may present a virtual representation of the instrument in three-dimensional space with the correct position and orientation for the operator to match with the physical instrument.

The AR device display screen may present guidance images for the surgical steps. By viewing through the AR device display screen, an operator may see the guidance images appear on the patient's body. For example, a surgical step may be to make an incision. The operator may be presented with an incision marker of where the incision should be made on the patient's body. Utilizing the camera of the AR device to orient with the view of the operator, as the view of what the operator sees changes, the position and location on the body of the incision marker does not change. In an example, when placing an implant, such as a new hip joint, the AR device display screen may present a virtual image of the hip implant. By analyzing the position and orientation of the body and bones of the patient, virtual hip implant image is presented in the proper position and alignment corresponding to the patient. For proper seating of the implant, the operator may match the position and alignment of the virtual hip implant image with the physical hip implant.

The AR system may determine, such as by monitoring through the camera, when a surgical step has been completed. The AR system may advance to the next surgical step by presenting to the operator on the display screen information for the next surgical step, such as textual instructions or a virtual representation of the surgical action. The AR system may continue to determine when each surgical step is complete and advance to the next surgical step until all surgical steps for the surgical procedure have been completed. The AR system may also monitor the performance of the steps by the operator to determine if the steps are being completed correctly. When the AR system determines a surgical step is not being performed correctly, an alert may be transmitted to make the operator aware. The alert may be a virtual flashing presented on the display screen or a buzzing sound if the AR device has sound capability. The images presented on the display screen may also change, such as changing the color of the presented virtual images to red or flashing the textual instruction that is not being performed correctly.

The operators in a surgical field during a surgical operation may utilize multiple AR devices. The AR devices may be in a networked communication with each other, wherein the information presented in each AR device display screen may have dependencies on the actions determined by another AR device. The surgical field may have multiple operators each with an AR device, with one operator classified as the lead operator to perform the surgical steps of the surgical procedure. The AR device of the lead operator may present the surgical step to be performed while the AR devices of the other operators may also present the surgical step such that the other operators are aware of the surgical action the lead operator is performing.

In an embodiment, a second operator may have a secondary surgical action to perform while the lead operator performs the primary surgical action. The AR device for the lead operator may present the primary surgical step of the surgical procedure for the lead operator to perform while the AR device for the second operator may present the secondary step to assist the primary surgical step for the second operator to perform. For example, a surgical step may be to drill a hole into a bone using a jig, wherein the jig must be held in place while the hole is drilled. The AR device of the second operator may present information for positioning and holding the jig in place. The AR device of the lead operator may present information for drilling the hole using the jig as a guide.

In an embodiment, the information presented to a second operator may be dependent upon the actions determined by information gathered from the AR device of the lead operator. The AR system, while monitoring a surgical procedure step to determine completeness of the step, may also monitor for side effect scenarios. A side effect scenario may be something that occurs during a surgical step or a surgical step that was not planned. For example, while the lead operator is performing a surgical step, the AR system may determine blood is pooling in the surgery site. This determination may prompt a side effect scenario and a new surgical step may be presented to the second operator, such as applying more gauze or cauterizing a blood vessel. The anticipation and determination of side effect scenarios may allow for the lead operator to focus on the primary surgical step and not have their attention diverted to request assistance.

A database may store a plurality of surgical procedures, wherein a stored surgical procedure includes textual instructions, images, three-dimensional representations of instruments and procedural actions, and image analysis characteristics to determine completeness of a step or secondary scenarios. The surgical procedures may be linear and the surgical procedures may have branching options. During a surgical procedure, when an operator completes a current step, there may be multiple next steps based on factors found during the completion of the current step. The operator may input the factors found or the AR system may analyze the images taken from the surgical site to determine which next step to proceed with. For example, a patient may be having issues with their hip joint. Scans, such as x-rays or a Magnetic Resonance Imaging (MRI) image may show the hip joint has bumps or inconsistencies on the surface. The proper remedy may not be able to be determined until a surgical procedure takes place and the doctor may view the actual hip bone. In this scenario, the operator may be presented with a linear set of steps for operating until the hip joint is visible. Once the hip joint is visible, a determination may be made, such as sanding the bone or placing a ball cap on the ball joint. Based on the determination, the operator may be presented with the steps for proceeding with the determined procedure.

Figure 8:
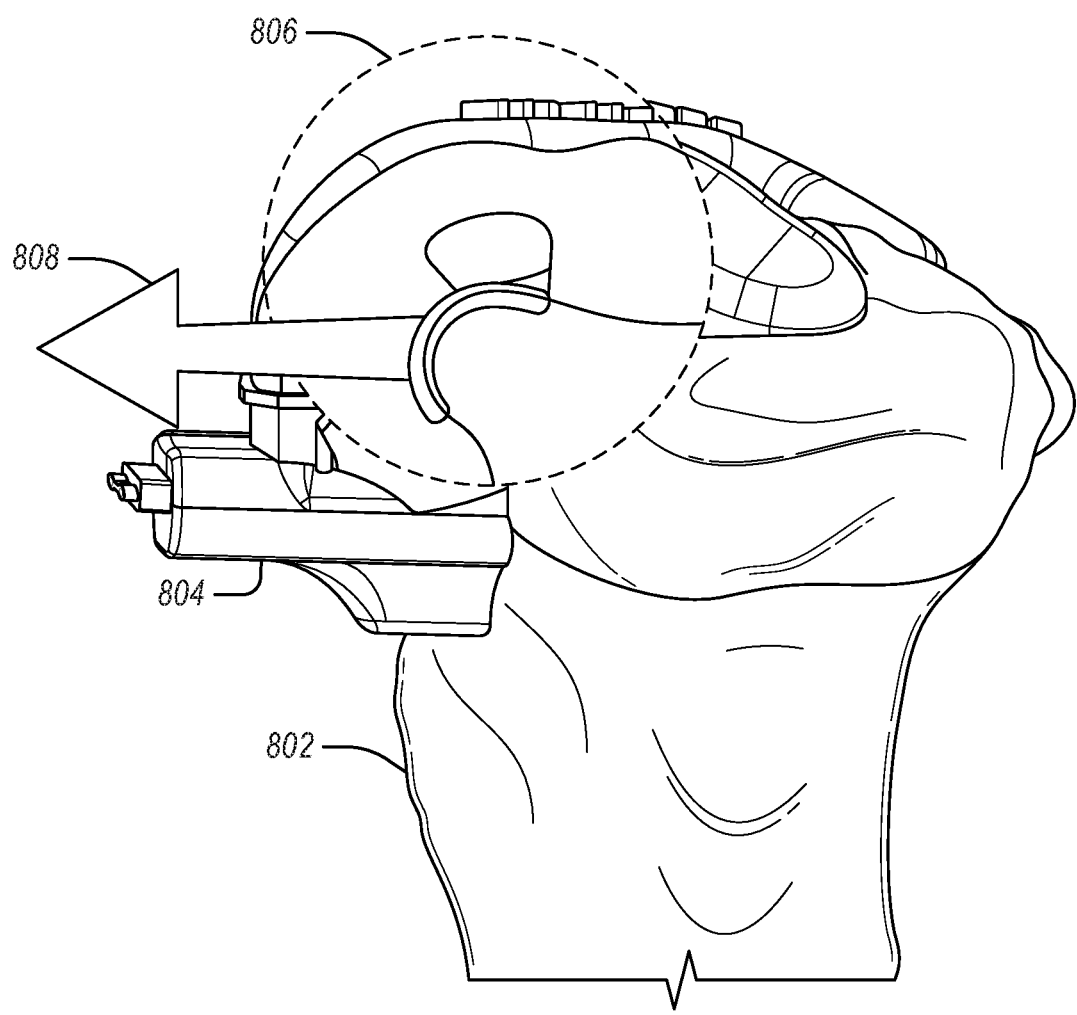
FIG. 8 illustrates a virtual representation of a force to be applied during a surgical procedure in accordance with some embodiments.

FIG. 8 illustrates a virtual representation of a force 808 to be applied during a surgical procedure in accordance with some embodiments. The virtual representation of the force 808 may illustrate a direction for the force to be applied, such as to remove a tibial jig 804, the virtual representation of the force 808 displayed using an AR display. The virtual representation of the force may be displayed to guide a surgeon in applying the force. FIG. 8 includes an overlaid virtual image 806 to show occluded parts of the tibial jig 804, bone, etc., that are obstructed from view. The overlaid virtual image 806 allows a surgeon to view a virtual representation of the occluded parts while performing the surgical procedure.

The virtual representation of the force 808 may be used to demonstrate an action to be taken with an instrument (e.g., showing a technique for proper mixing of bone cement, or proper application of a force). Other techniques or actions may be represented by the virtual representation, such as a rotation, a sliding movement, a torque to be applied, or the like. The AR display may include virtual representations of tools or actions. By using the AR display, paper or two-dimensional screen usage may be reduced or eliminated for these techniques. For example, operations of a technique to be performed may be represented virtually to show a surgeon how to perform the technique. In an example, a bone landmark may be highlighted. The highlight may be used to show a reference location (e.g., on a bone) for an instrument (e.g., with a tibial drop rod, highlighting or accentuating the center of the malleoli that the rod is supposed to point to).

Figure 9:
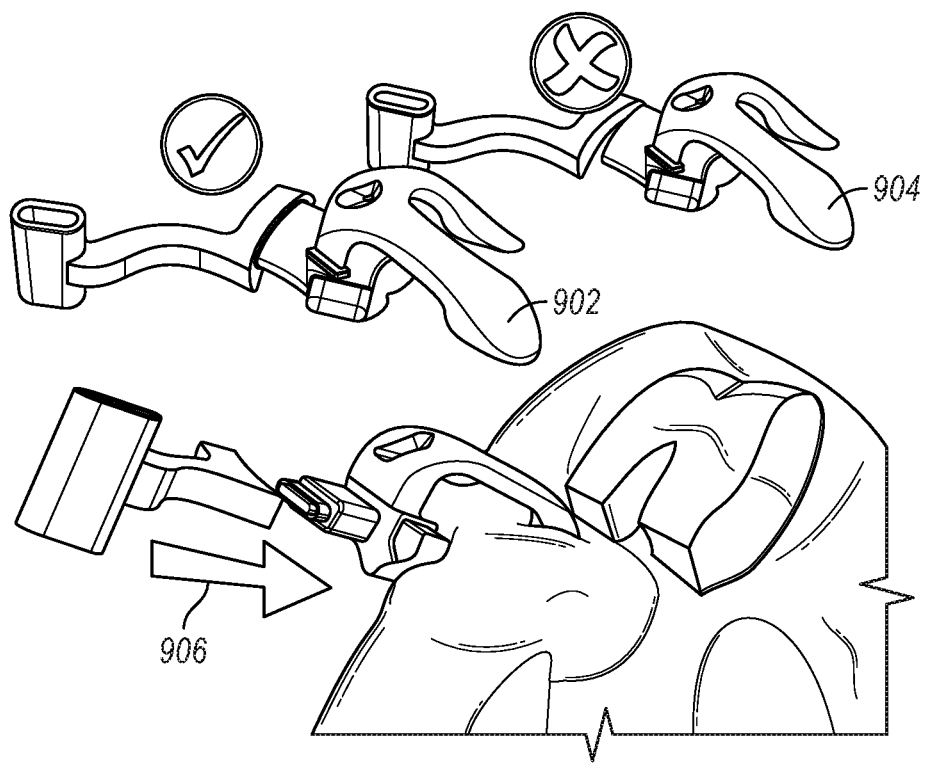
FIG. 9 illustrates virtual representations for use in instrument placement in accordance with some embodiments.

FIG. 9 illustrates virtual representations for use in instrument placement in accordance with some embodiments. The virtual representations may include a correct alignment three-dimensional virtual representation 902 or an incorrect alignment three-dimensional virtual representation 904 displayed using an AR display. Similar to the techniques described above for FIG. 8, a movement or force indication 906 may be displayed virtually to indicate a direction or force for placing an instrument. The correct alignment three-dimensional virtual representation 902 may be shown with the incorrect alignment three-dimensional virtual representation 904. In an example, the correct alignment three-dimensional virtual representation 902 may be shown on the AR display automatically. Then, if a surgeon selects an option to receive additional guidance, the incorrect alignment three-dimensional virtual representation 904 may be shown. In another example, an AR device (e.g., using a camera) may automatically detect that a placement alignment of an instrument in a surgical field is incorrect or may be placed incorrectly. In response, the AR display may show the correct alignment three-dimensional virtual representation 902 or the incorrect alignment three-dimensional virtual representation 904. The incorrect alignment three-dimensional virtual representation 904 may include additional information, such as text indicating that the incorrect alignment three-dimensional virtual representation 904 is a common alignment issue, or an animation to show how the incorrect alignment three-dimensional virtual representation 904 occurs or to show how to change an incorrect alignment to one matching the correct alignment three-dimensional virtual representation 902. In an example, the three-dimensional virtual representations 902 and 904 may represent a tibial jig.

Figure 10:
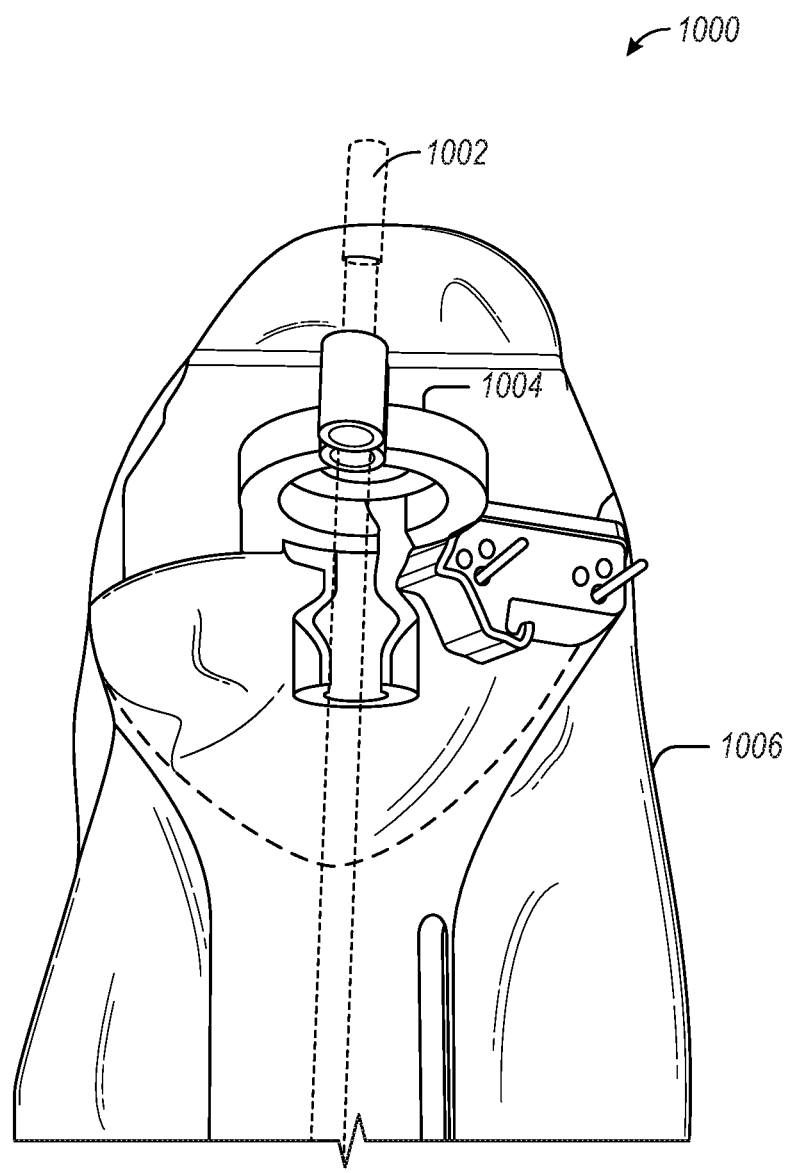
FIG. 10 illustrates instrument alignment using a virtual alignment guide (e.g., a "ghost") in accordance with some embodiments.

FIG. 10 illustrates instrument alignment using a virtual alignment guide 1002 (e.g., a "ghost") in accordance with some embodiments. The virtual alignment guide 1002 may be a "ghost," which refers to a partially translucent virtual representation that is visible and also allows real aspects behind the ghost to be visible (e.g., partially see through). The virtual alignment guide 1002 may include a virtual representation of an alignment rod. The alignment rod is typically used to align a cut guide 1004 to secure the cut guide 1004 (e.g., to a bone 1006), perform a cut, or to verify alignment. In an example, the virtual alignment guide 1002 may eliminate the need for the alignment rod by virtually displaying a representation of the alignment rod. The virtual alignment guide 1002 may be used to align the cut guide 1004 to the bone 1006 to secure the cut guide 1004, to perform the cut, or to verify alignment by displaying a virtual alignment rod. Thus, the virtual alignment guide 1002 removes the need to use a physical alignment rod, reducing manufacturing costs, time to perform a procedure, and the potential hassle of inserting the alignment rod. The virtual alignment guide 1002 may be automatically displayed using an AR display, such as when the cut guide is placed.

Figure 11A:
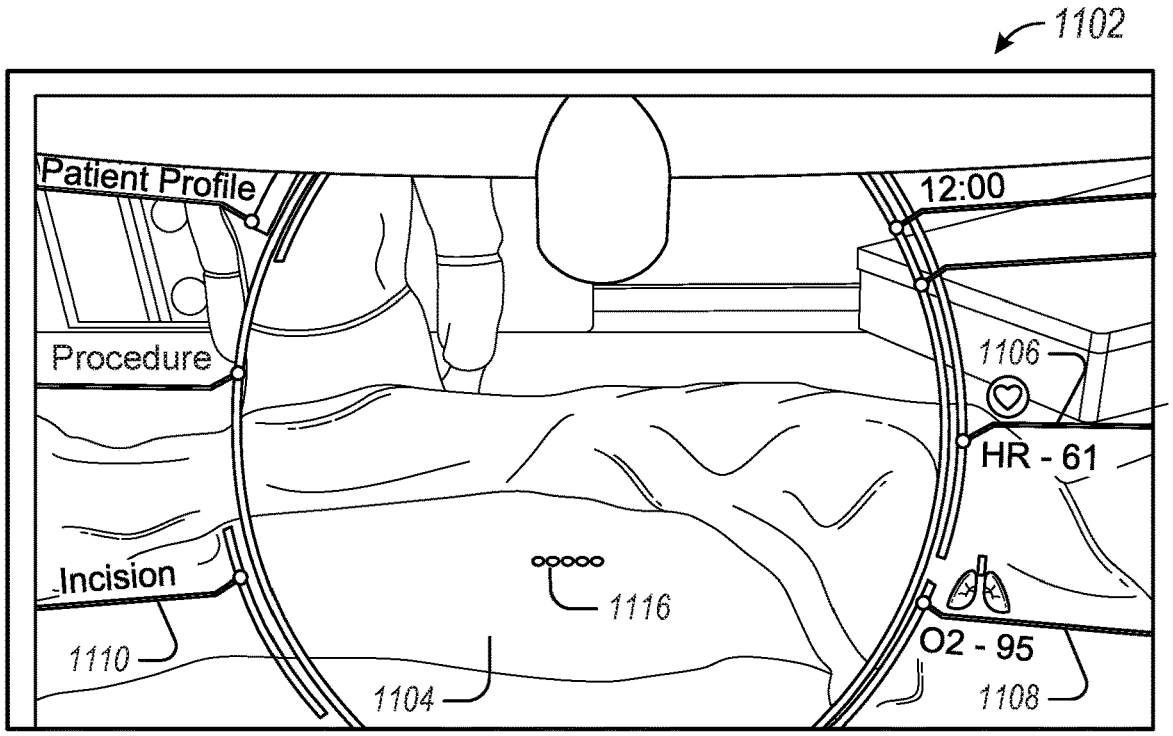
FIGS. 11A-11B illustrate clinical augmented reality displays in accordance with some embodiments.
Figure 11B:
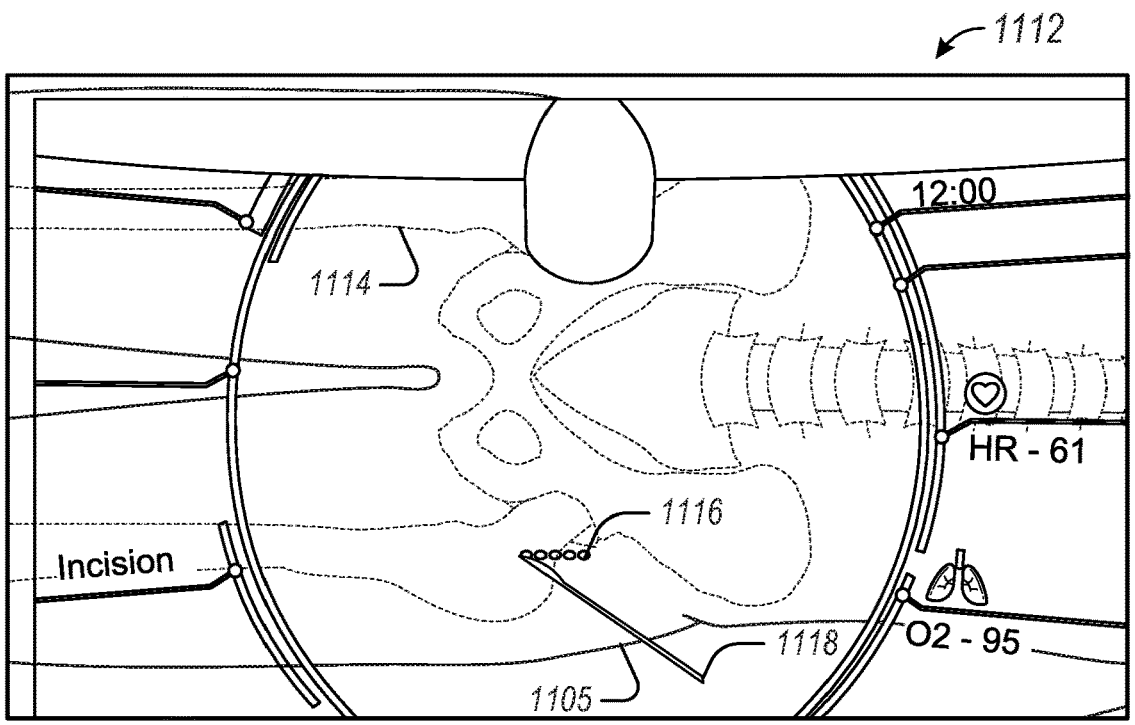

FIGS. 11A-11B illustrate diagnostic augmented reality displays in accordance with some embodiments. FIG. 11A illustrates an AR display 1102 of a patient (e.g., including a target area 1104 for a surgical procedure), such as in a surgical field. The AR display 1102 may include technical information displayed virtually, such as heart rate 1006 or oxygen content 1008 for a patient being viewed through the AR display 1102. The AR display 1102 may include patient information (e.g., name, age, allergies, potential patient-specific complications, etc.), procedure information 1110 (e.g., type of procedure, side of the body, etc.), readiness information, time or counters, or the like. The displayed information may be accessed or changed in real time, including updating the information for display in the AR display 1102. In an example, a clinician using the AR display 1102 may change the information displayed, such as by using a gesture or input device, or may save the information or a snapshot of the AR display 1102, such as to a patient file.

FIG. 11B illustrates an AR display 1112 including a virtual skeleton 1114 overlaid on a patient 1105, for example in a surgical field. The AR display 1112 may include aspects described above in relation to AR display 1112. The virtual skeleton 1114 may be generated from an image of the patient 1105 or using a camera of an AR device including the AR display 1112. The virtual skeleton 1114 may be virtually coupled to the patient 1105, for example, such that when the patient 1105 moves or is moved, the virtual skeleton 1114 moves accordingly.

The AR display 1102 may include a virtual indicator 1116 to guide a clinician. The virtual indicator 1116 may be displayed in the AR display 1102 in a location where the clinician is to perform an incision. In an example, virtual guidance information may be displayed in the AR display 1112, such as the virtual indicator 1116 to indicate a location to perform an incision. The virtual indicator 1116, like the virtual skeleton 1114 may be virtually coupled to the patient 1105 and move when the patient 1105 moves or is moved. A scalpel 1118 is represented in FIG. 11B. The scalpel 1118 shown is a physical scalpel, shown in FIG. 11B to illustrate how a surgeon may see the scalpel 1118 and the virtual indicator 1116 together through the AR display 1102, while performing the surgical procedure. By allowing real-world objects (e.g., the scalpel 1118) to be viewed and presenting virtual objects (e.g., the virtual indicator 1116), the AR display 1102 presents a mixed reality or augmented reality for the surgeon to more accurately perform the surgical procedure. By using the AR display 1102, the surgeon is allowed to focus on the surgical procedure without needing to direct attention away from the surgical procedure to consult information.

Figure 12:
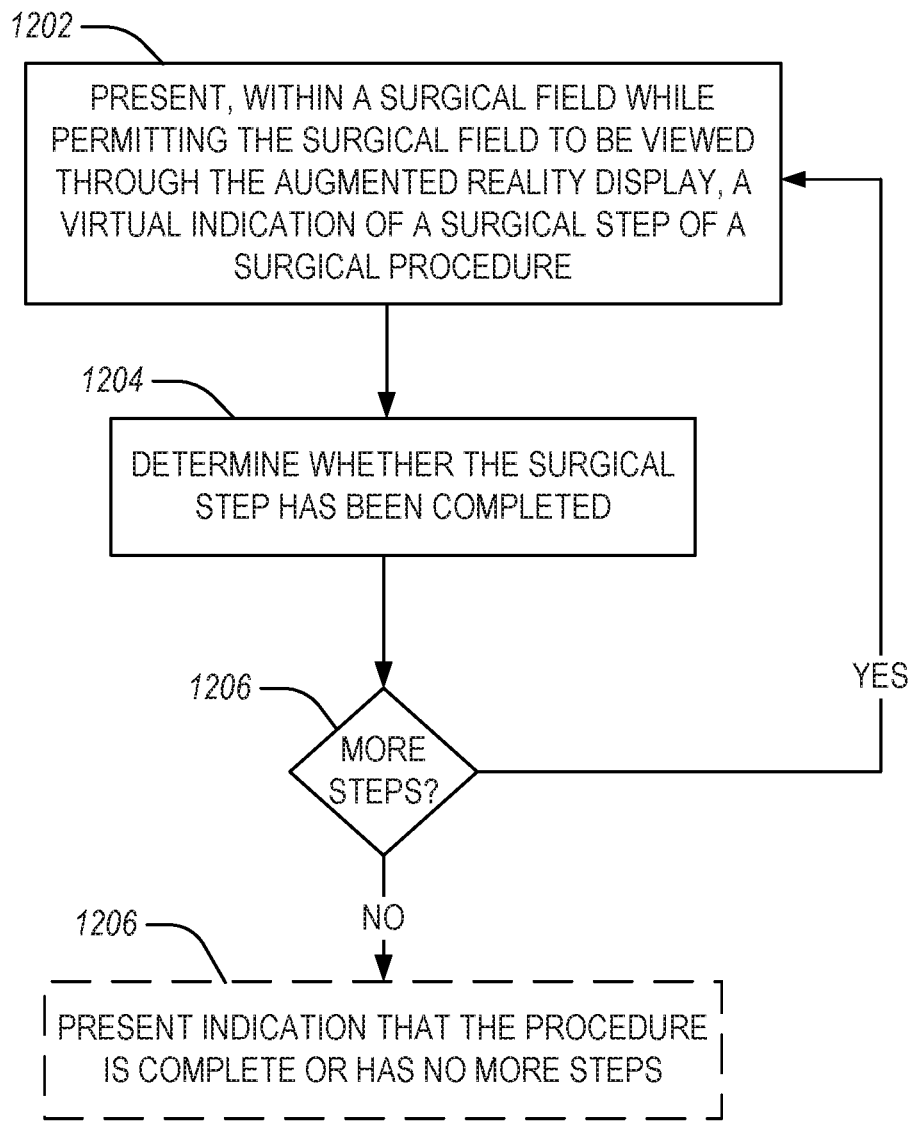
FIG. 12 illustrates a flow chart showing a technique for presenting virtual aspects of a surgical procedure in accordance with some embodiments.

FIG. 12 illustrates a flow chart showing a technique 1200 for presenting virtual aspects of a surgical procedure in accordance with some embodiments. The surgical procedure may be identified and may include a plurality of surgical steps. In an example, identification may include receiving an indication of the surgical procedure via a user input using the augmented reality device. In another example, identification may include querying a database to determine the surgical procedure based on at least one of a patient name or a patient identifier. In yet another example, identification may include determining whether the plurality of surgical steps are virtually representable. When all of the plurality of surgical steps are virtually representable, the technique 1200 may include presenting the surgical step. When at least one step of the plurality of surgical steps are not virtually representable, the technique 1200 may include presenting an indication identifying the at least one step that is not virtually representable using the AR display. In this second example, the surgical step may still be presented. In an example, the surgical steps may be ordered. For example, a first surgical step may come before a second surgical step in the ordered surgical steps, and a virtual representation of the first surgical step may be presented before a virtual representation of the second surgical step.

The technique 1200 includes an operation 1202 to present, within a surgical field while permitting the surgical field to be viewed through the augmented reality display, a virtual indication of a surgical step of a surgical procedure. Operation 1202 may include presenting a virtual animation or a previously captured video of the surgical step.

The technique 1200 includes an operation 1204 to determine whether the surgical step has been completed. In response to determining that the surgical step has been completed or started, the technique 1200 may include removing the virtual indication of the surgical step from display. In an example, operation 1204 may include receiving an indication that the surgical step has been completed via a user input using the augmented reality device or identifying a gesture using a camera of the augmented reality device. For example, a surgeon may press a button (e.g., on a foot pedal) to indicate the step is complete, or the camera may capture a gesture performed by the surgeon, such as snapping fingers, waving, holding up a number of fingers (e.g., to correspond to a next step to proceed to), or the like. In another example, operation 1204 may include identifying an aspect of the surgical step using a camera of the augmented reality device, and based on the identified aspect, determining that the surgical step has been completed. For example, the camera may capture a presence of a surgical instrument or other item, which may indicate that the surgical step has started or is completed, which may be used to indicate that the virtual representation should no longer be presented. In an example, the aspect may include gesture with a surgical instrument or other item (e.g., the camera may detect when a pin or screw has been inserted).

The technique 1200 includes a decision operation 1206 to determine whether there are more steps within the surgical procedure or the plurality of surgical steps. When there are one or more additional steps (which may be ordered, not ordered, or partially ordered, such as step 1 must come before 2, but steps 3 and 4 can be done in either order, or before step 1), the technique 1200 may return to operation 1202 to display a virtual representation of the next step. This process may be iterated while there are remaining steps. When there are no additional steps to display, the technique 1200 includes an optional operation 1208 to present an indication that the procedure is complete or has no more steps. In an example, a next surgical procedure may be automatically presented or an option to start the next surgical procedure may be presented. The technique 1200 may include determining whether a second surgical step has been started or completed (e.g., after a virtual representation of the second surgical step has been presented).

The technique 1200 may include an operation to receive a surgeon control command to cause an aspect of the virtual representation of the surgical step to rotate, zoom translate, play, rewind, fast forward, restart, pause, end, or the like. The technique 1200 may include displaying patient information in a heads-up display portion of the augmented reality display. In an example, the technique 1200 may include, before determining that the surgical step has been completed, determining that the surgical step is not being performed. In an example, the AR display may present an alert. For example, when a different surgical step of the plurality of surgical steps is being performed, the alert may indicate that the different surgical step is being performed. The technique 1200 may include providing a user selectable option to switch to presenting a virtual representation of the different surgical step. In another example, the technique 1200 may include automatically switching to the virtual representation of the different surgical step. In yet another example, the AR display may simply stop presenting the virtual representation of the surgical step (e.g., stop and do nothing). In an example, the technique 1200 may include presenting a virtual guidance marker on a patient corresponding to an aspect of the surgical step, the virtual guidance marker indicating a location to perform the surgical step, including at least one of an incision location, a resection location, an implant location, a force direction, a pin location, or the like.

Example 1 is an augmented reality device for use during a surgical procedure comprising: an augmented reality display to: present, within a surgical field while permitting the surgical field to be viewed through the augmented reality display, a virtual indication of a surgical instrument present within the surgical field; a processor to: determine whether the surgical instrument has been selected; and cause the virtual indication to be removed from display in response to determining that the surgical instrument has been selected.

In Example 2, the subject matter of Example 1 includes, a detection device to identify the surgical instrument from at least one of: a plurality of surgical instruments, a box including the surgical instrument, and a tray including the surgical instrument.

In Example 3, the subject matter of Example 2 includes, wherein the detection device includes at least one of a camera, an optical imaging device, and an electronic identification device.

In Example 4, the subject matter of Examples 1-3 includes, a proximity detector, a motion sensor, or a button on the surgical instrument to identify the surgical instrument.

In Example 5, the subject matter of Examples 1-4 includes, wherein the augmented reality device is to notify a second augmented reality device to instruct a user to obtain the surgical instrument or to alert a user that the surgical instrument has been obtained.

In Example 6, the subject matter of Examples 1-5 includes, wherein the augmented reality display is further to display at least a portion of a view from a second augmented reality device.

In Example 7, the subject matter of Examples 1-6 includes, wherein the augmented reality display is to include patient information in a heads-up portion of the augmented reality display.

In Example 8, the subject matter of Examples 1-7 includes, wherein the augmented reality display is to present a series of virtual components to provide instruction for assembly of the surgical instrument.

In Example 9, the subject matter of Example 8 includes, wherein the series of virtual components are displayed in progression automatically in response to the processor detecting, automatically using a detection device or based on a user input, that an operation corresponding to one of the series of virtual components is complete.

Example 10 is an augmented reality device for use in a surgical field comprising: an augmented reality display; and a processor to: identify a surgical procedure including a plurality of surgical steps; cause the augmented reality display to present, overlaid on a view of the surgical field while permitting the surgical field to be viewed through the augmented reality display, a virtual representation of a surgical step of the plurality of surgical steps; determine whether the surgical step has been completed; and in response to determining that the surgical step has been completed, cause the augmented reality to present, within the surgical field, a virtual representation of a second surgical step of the plurality of surgical steps.

In Example 11, the subject matter of Example 10 includes, wherein to identify the surgical procedure, the processor is to receive an indication of the surgical procedure via a user input using the augmented reality device.

In Example 12, the subject matter of Examples 10-11 includes, wherein to identify the surgical procedure, the processor is to query a database to determine the surgical procedure based on at least one of a patient name or a patient identifier.

In Example 13, the subject matter of Examples 10-12 includes, wherein to identify the surgical procedure, the processor is to determine whether the plurality of surgical steps are virtually representable; and in accordance with a determination that at least a portion of the plurality of surgical steps are virtually representable, the processor is to present the surgical step; and in accordance with a determination that a current step of the plurality of surgical steps is not virtually representable, the processor is to present an indication identifying the current step that is not virtually representable using the augmented reality display.

In Example 14, the subject matter of Examples 10-13 includes, wherein the processor is further to determine that the current step that is not virtually representable has been completed, and in response, displaying the virtual representation of the second surgical step, the second surgical step being virtually representable within the augmented reality display.

In Example 15, the subject matter of Examples 10-14 includes, wherein to present the surgical step, the processor is to present a virtual animation of the surgical step.

In Example 16, the subject matter of Examples 10-15 includes, wherein to present the surgical step, the processor is to present a previously captured video of the surgical step.

In Example 17, the subject matter of Examples 10-16 includes, wherein the processor is further to receive a surgeon control command to cause an aspect of the virtual representation of the surgical step to rotate, zoom, translate, play, rewind, fast forward, pause, restart, or end.

In Example 18, the subject matter of Examples 10-17 includes, wherein to determine that the surgical step has been completed, the processor is to receive an indication that the surgical step has been completed via a user input using the augmented reality device.

In Example 19, the subject matter of Examples 10-18 includes, wherein to determine that the surgical step has been completed, the processor is to identify a gesture using a camera of the augmented reality device.

In Example 20, the subject matter of Examples 10-19 includes, wherein to determine that the surgical step has been completed, the processor is to identify an aspect of the surgical step using a camera of the augmented reality device, and based on the identified aspect, determine that the surgical step has been completed.

In Example 21, the subject matter of Examples 10-20 includes, wherein the processor is further to determine whether the second surgical step has been completed; in response to determining that the second surgical step has been completed, the processor is to determine whether there are any remaining surgical steps in the plurality of surgical steps that have not yet been presented; in accordance with a determination that there is at least one surgical step remaining, the processor is to present a virtual representation of the at least one surgical step; in accordance with a determination that there are no remaining surgical steps, the processor is to present a virtual indication that the surgical procedure is complete.

Example 22 is a method for using an augmented reality device in a surgical field comprising: identifying, using a processor, a surgical procedure including a plurality of surgical steps; presenting using an augmented reality display of the augmented reality device, overlaid on a view of the surgical field while permitting the surgical field to viewed through the augmented reality display, a virtual representation of a first surgical step of the plurality of surgical steps; determining whether the first surgical step has been completed; and in response to determining that the surgical step has been completed, presenting using an augmented reality display of the augmented reality device, within the surgical field, a virtual representation of a second surgical step of the plurality of surgical steps.

In Example 23, the subject matter of Example 22 includes, displaying patient information in a heads-up display portion of the augmented reality display.

In Example 24, the subject matter of Examples 22-23 includes, before determining that the surgical step has been completed, determining that the surgical step is not being performed; determining that a different surgical step of the plurality of surgical steps is being performed; displaying an alert using the augmented reality display indicating that the different surgical step is being performed; and providing a user selectable option to switch to presenting a virtual representation of the different surgical step.

In Example 25, the subject matter of Examples 22-24 includes, presenting a virtual guidance marker on a patient corresponding to an aspect of the surgical step, the virtual guidance marker indicating a location to perform the surgical step, including at least one of an incision location, a resection location, an implant location, a force direction, or a pin location.

In Example 26, the subject matter of Examples 22-25 includes, wherein the surgical steps are ordered and the surgical step comes before the second surgical step in the ordered surgical steps, and wherein the virtual representation of the surgical step is presented before the virtual representation of the second surgical step.

Example 27 is a method for using an augmented reality device in a surgical field comprising: identifying, using a processor, a surgical procedure including a plurality of surgical steps; determining, from the surgical procedure, a surgical instrument needed for a surgical step of the plurality of surgical steps; presenting using an augmented reality display of the augmented reality device, overlaid on a view of the surgical field while permitting the surgical field to viewed through the augmented reality display, a virtual representation of the surgical instrument; determining whether the surgical step has been completed; and in response to determining that the surgical step has been completed, presenting using an augmented reality display of the augmented reality device, within the surgical field, a virtual representation of a second instrument for a second surgical step of the plurality of surgical steps.

In Example 28, the subject matter of Example 27 includes, identifying the second surgical step based on identifying a visual or audio indication.

In Example 29, the subject matter of Examples 27-28 includes, determining whether the surgical instrument is needed in a later surgical step of the plurality of surgical steps.

In Example 30, the subject matter of Example 29 includes, in response to determining that the surgical instrument is needed in the later surgical step, displaying a virtual indication that the surgical instrument is needed in the later surgical step.

Example 31 is at least one machine-readable medium including instructions that, when executed by processing circuitry, cause the processing circuitry to perform operations to implement of any of Examples 1-30.

Example 32 is an apparatus comprising means to implement of any of Examples 1-30.

Example 33 is a system to implement of any of Examples 1-30.

Example 34 is a method to implement of any of Examples 1-30.

Method examples described herein may be machine or computer-implemented at least in part. Some examples may include a computer-readable medium or machine-readable medium encoded with instructions operable to configure an electronic device to perform methods as described in the above examples. An implementation of such methods may include code, such as microcode, assembly language code, a higher-level language code, or the like. Such code may include computer readable instructions for performing various methods. The code may form portions of computer program products. Further, in an example, the code may be tangibly stored on one or more volatile, non-transitory, or non-volatile tangible computer-readable media, such as during execution or at other times. Examples of these tangible computer-readable media may include, but are not limited to, hard disks, removable magnetic disks, removable optical disks (e.g., compact disks and digital video disks), magnetic cassettes, memory cards or sticks, random access memories (RAMs), read only memories (ROMs), and the like.

What is claimed is:

1. An augmented reality device for use during a surgical procedure comprising:
    an augmented reality display, the augmented reality display including a head-mounted display lens allowing aspects of a surrounding environment to be visible while projecting light on the head-mounted display lens to make virtual elements visible to a wearer of the augmented reality display, the augmented reality display to:
    present, within a surgical field while permitting the surgical field to be viewed through the augmented reality display, a virtual indication on the augmented reality display identifying a location of a physical surgical instrument among a plurality of surgical instruments present within the surgical field to be retrieved for use during a step within a surgical procedure, wherein the virtual indication is continuously maintained in a set position relative to and spatially registered with the location of the physical surgical instrument;
    a processor to:
    determine whether the physical surgical instrument within the surgical field has been moved; and
    cause the virtual indication to be removed from the augmented reality display in response to determining that the physical surgical instrument has been moved and determining that the physical surgical instrument remains visible within in the field of view of the augmented reality display.

2. The augmented reality device of claim 1, further comprising a detection device to identify the physical surgical instrument from at least one of: a plurality of surgical instruments, a box including the physical surgical instrument, and a tray including the physical surgical instrument.

3. The augmented reality device of claim 2, wherein the detection device includes at least one of a camera, an optical imaging device, and an electronic identification device.

4. The augmented reality device of claim 1, further comprising a proximity detector, a motion sensor, or a button on the physical surgical instrument to identify the physical surgical instrument.

5. The augmented reality device of claim 1, wherein the augmented reality device is to notify a second augmented reality device to instruct a user to obtain the physical surgical instrument or to alert a user that the physical surgical instrument has been obtained.

6. The augmented reality device of claim 1, wherein the augmented reality display is further to display at least a portion of a view from a second augmented reality device.

7. The augmented reality device of claim 1, wherein the augmented reality display is to include patient information in a heads-up portion of the augmented reality display.

8. The augmented reality device of claim 1, wherein the augmented reality display is to present a series of virtual components to provide instruction for assembly of the physical surgical instrument.

9. The augmented reality device of claim 8, wherein the series of virtual components are displayed in progression automatically in response to the processor detecting, automatically using a detection device or based on a user input, that an operation corresponding to one of the series of virtual components is complete.

10. The augmented reality device of claim 1, wherein the virtual indication is not visible to a viewer outside a room containing the surgical field.

* * * * *